(12) United States Patent
Kurasawa

(10) Patent No.: US 10,628,650 B2
(45) Date of Patent: Apr. 21, 2020

(54) COVER MEMBER AND DISPLAY DEVICE

(71) Applicant: Japan Display Inc., Tokyo (JP)

(72) Inventor: Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 203 days.

(21) Appl. No.: 15/395,159

(22) Filed: Dec. 30, 2016

(65) Prior Publication Data

US 2017/0205958 A1 Jul. 20, 2017

(30) Foreign Application Priority Data

Jan. 14, 2016 (JP) .................................. 2016-005330

(51) Int. Cl.
*G06K 9/00* (2006.01)
*G06F 3/044* (2006.01)
*G06F 3/041* (2006.01)
*G02F 1/1333* (2006.01)

(52) U.S. Cl.
CPC ......... *G06K 9/00013* (2013.01); *G06F 3/044* (2013.01); *G06F 3/0412* (2013.01); *G06F 3/0416* (2013.01); *G06F 3/0445* (2019.05); *G06F 3/0448* (2019.05); *G06K 9/0004* (2013.01); *G02F 1/13338* (2013.01); *G06F 2203/04103* (2013.01); *G06F 2203/04108* (2013.01)

(58) Field of Classification Search
CPC .... G06F 3/03547; G06F 3/041; G06F 3/0412; G06F 3/0418; G06F 3/044; G06F 2203/0336; G06F 2203/0338; G06F 2203/0339; G06F 2203/04108; G06K 9/00006–00053; G06K 9/00087–001
See application file for complete search history.

(56) References Cited

U.S. PATENT DOCUMENTS

2003/0016024 A1 1/2003 Teranuma et al.
2008/0054875 A1* 3/2008 Saito .................... G06K 9/0002 324/71.5
2009/0273570 A1* 11/2009 Degner .................. G06F 3/044 345/173
2009/0273577 A1* 11/2009 Chen ...................... G06F 3/044 345/174

(Continued)

FOREIGN PATENT DOCUMENTS

JP 2002-245443 A 8/2002
JP 2003-090703 A 3/2003

(Continued)

OTHER PUBLICATIONS

Japanese Office Action dated May 21, 2019 corresponding to Japanese Patent Application No. 2016-005330.

*Primary Examiner* — Nathan Danielsen
(74) *Attorney, Agent, or Firm* — Michael Best & Friedrich LLP

(57) ABSTRACT

A first substrate including a first surface and a second surface on an opposite side of the first surface, the first surface being a detection surface for detecting unevenness of an object coming in contact or close, a second substrate facing the other surface of the first substrate, and a sensor unit provided between the first substrate and the second substrate, and which detects the unevenness of a finger coming in contact with or close to the detection surface.

20 Claims, 27 Drawing Sheets

(56) References Cited

U.S. PATENT DOCUMENTS

| | | | |
|---|---|---|---|
| 2011/0199330 A1* | 8/2011 | Hsu | G06F 3/044 345/174 |
| 2011/0234519 A1* | 9/2011 | Chan | G02F 1/13338 345/173 |
| 2012/0090757 A1 | 4/2012 | Buchan et al. | |
| 2012/0319966 A1* | 12/2012 | Reynolds | G06F 3/041 345/173 |
| 2015/0015813 A1* | 1/2015 | Yoshinari | G06F 3/044 349/12 |
| 2015/0153858 A1* | 6/2015 | Kim | G06F 3/044 345/173 |
| 2015/0355752 A1 | 12/2015 | Kurasawa et al. | |
| 2015/0378494 A1* | 12/2015 | Cok | G06F 3/0416 345/174 |
| 2016/0085346 A1* | 3/2016 | Tsukamoto | G06F 3/0416 345/174 |
| 2016/0179276 A1* | 6/2016 | Nathan | G06F 3/0414 345/174 |
| 2017/0147098 A1 | 5/2017 | Fukatani | |

FOREIGN PATENT DOCUMENTS

| | | |
|---|---|---|
| JP | 2006-213206 A | 8/2006 |
| JP | 2013-020347 A | 1/2013 |
| JP | 2013-541780 A | 11/2013 |
| JP | 2015-232819 A | 12/2015 |
| WO | 2015/152334 A1 | 10/2015 |

* cited by examiner

COVER MEMBER AND DISPLAY DEVICE

CROSS-REFERENCE TO RELATED APPLICATIONS

This application claims priority from Japanese Application No. 2016-005330, filed on Jan. 14, 2016, the contents of which are incorporated by reference herein in its entirety.

BACKGROUND

1. Technical Field

The present disclosure relates to a cover member and a display device.

2. Description of the Related Art

A fingerprint sensor is sometimes provided in an electronic apparatus including a display device such as a liquid crystal display device. The fingerprint sensor detects a shape of a fingerprint by detecting unevenness of the fingerprint held by a finger in contact with the fingerprint sensor (for example, Japanese Patent Application Laid-open Publication No. 2002-245443). A detection result of the fingerprint sensor is used for, for example, personal authentication. A surface of the fingerprint sensor is provided with a glass substrate for protecting the fingerprint sensor, and a surface of the glass substrate serves as a detection surface for allowing a finger to come in contact and detecting the fingerprint.

The glass substrate provided on the surface of the fingerprint sensor needs to have a predetermined thickness or more to increase the strength in order to prevent damage. However, if the glass substrate becomes thicker, the distance between a detection electrode of the fingerprint sensor and the finger becomes larger, and thus sufficient detection sensitivity may not be able to be obtained.

SUMMARY

According to one aspect, a cover member includes a first substrate including a first surface and a second surface on an opposite side of the first surface, and the first surface being a detection surface for detecting unevenness of an object coming in contact or close, a second substrate facing the second surface, and a sensor unit provided between the first substrate and the second substrate, and configured to detect the unevenness of a finger coming in contact with or close to the first surface.

According to one aspect, a display device includes the cover member described above, and a display unit provided on an opposite side of the first substrate with respect to the second substrate, and provided to face a transmissive region of the cover member and configured to display an image.

DETAILED DESCRIPTION

Forms for implementing the invention (embodiments) will be described in detail with reference to the drawings. The present invention is not limited by content described in the embodiments below. Configuration elements described below include elements easily conceived by a person skilled in the art and elements substantially the same. Further, the configuration elements described below can be appropriately combined. The disclosure is merely an example, and appropriate modifications which maintain the points of the invention, and which can be easily conceived by a person skilled in the art, are obviously included in the scope of the present invention. To make description more clear, the drawings may be schematically illustrated in the width, thickness, shape, and the like of respective portions, compared with actual forms. However, such illustration is merely an example, not limiting the construction of the present invention. In the present specification and drawings, elements similar to those described with respect to the drawings that have already been mentioned are denoted with the same reference signs, and detailed description may be appropriately omitted.

First Embodiment

Figure 1:
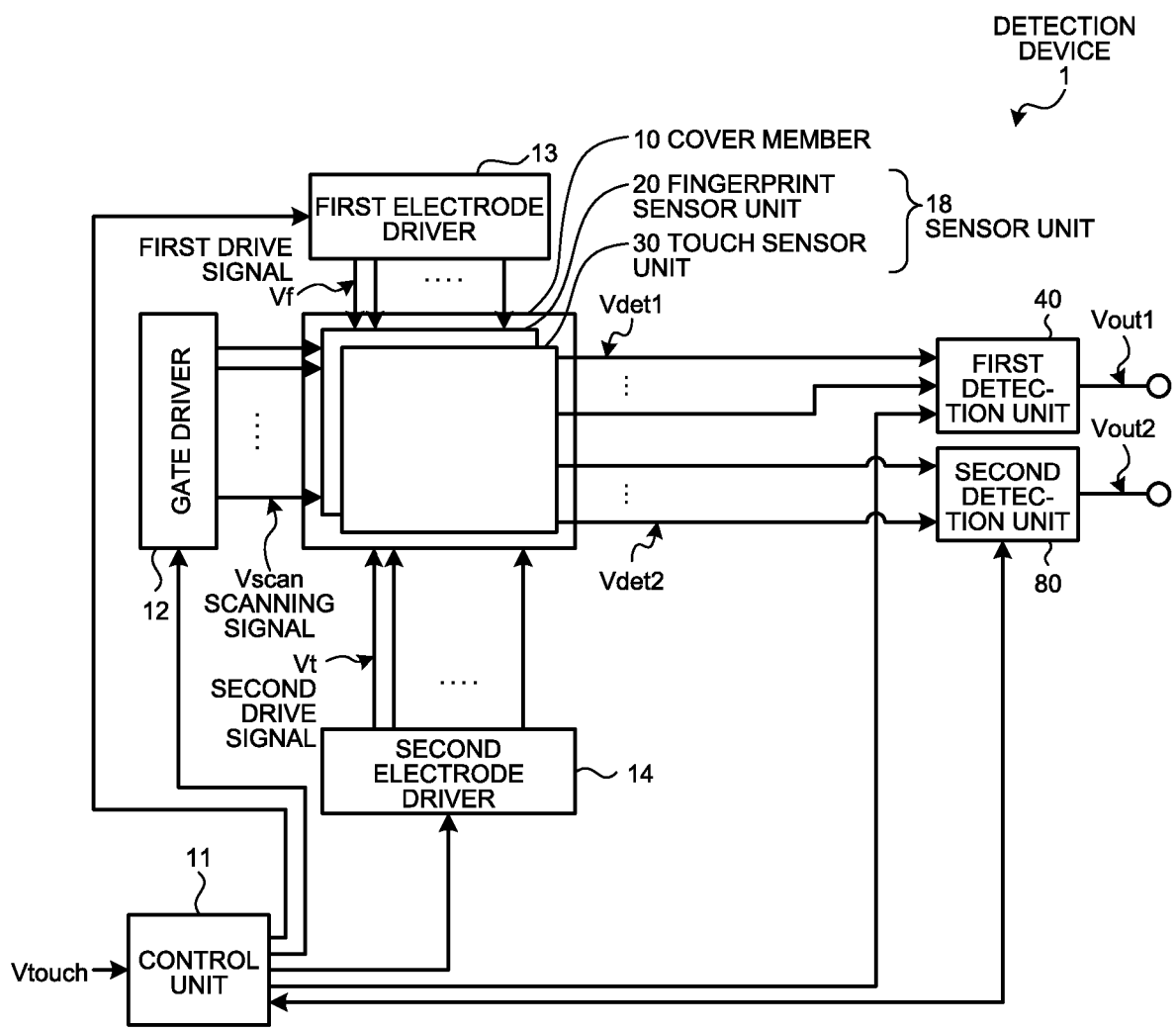
FIG. 1 is a block diagram illustrating a configuration example of a detection device including a cover member according to a first embodiment.

FIG. 1 is a block diagram illustrating a configuration example of a detection device including a cover member according to a first embodiment. As illustrated in FIG. 1, a detection device 1 includes a cover member 10, a control unit 11, a gate driver 12, a first electrode driver 13, a second electrode driver 14, a first detection unit 40, and a second detection unit 80. A sensor unit 18 is built in the cover member 10. The sensor unit 18 of the cover member 10 is a member in which a fingerprint sensor unit 20 that detects a fingerprint of a finger and a touch sensor unit 30 that detects approach and a position of the finger are integrated. The cover member 10 is mounted on a display surface such as a display panel using a liquid crystal display element as a display element. The display panel on which the cover member 10 is mounted may be an organic EL display panel, for example. As other configurations of the detection device 1, configurations built in the cover member 10 can be employed, or configurations provided in positions different from the cover member 10 and these different configurations being coupled with the sensor unit 18 of the cover member 10 on a flexible printed wiring board (FPC) can be employed.

The fingerprint sensor unit 20 sequentially scans one detection line at a time and performs detection according to a scanning signal Vscan supplied from the gate driver 12. The fingerprint sensor unit 20 detects the fingerprint by detecting unevenness of an object coming in contact or close, on the basis of a detection principle in a self-capacitance system. The touch sensor unit 30 is operated on the basis of a basic principle of capacitance-type touch detection, performs a touch detection operation in the self-capacitance system or a mutual capacitance system, and detects that an external conductor contacts or approaches a transmissive region. The fingerprint sensor unit 20 and the touch sensor unit 30 are controlled on the basis of a control signal Vtouch supplied to the control unit 11.

The control unit 11 supplies the control signals to the gate driver 12, the first electrode driver 13, the second electrode driver 14, the first detection unit 40, and the second detection unit 80, respectively, and controls these signals to be operated in synchronization with one another.

The gate driver 12 has a function to sequentially select one detection electrode block that serves as an object that is driven and detected by the fingerprint sensor unit 20 on the basis of the control signal supplied from the control unit 11.

The first electrode driver 13 is a circuit that supplies a first drive signal Vf to a first electrode 25 that serves as an object that is driven and detected by the fingerprint sensor unit 20 on the basis of the control signal supplied from the control unit 11.

The second electrode driver 14 is a circuit that supplies a second drive signal Vt to a second electrode 26 of the touch sensor unit 30 on the basis of the control signal supplied from the control unit 11.

Figure 2:
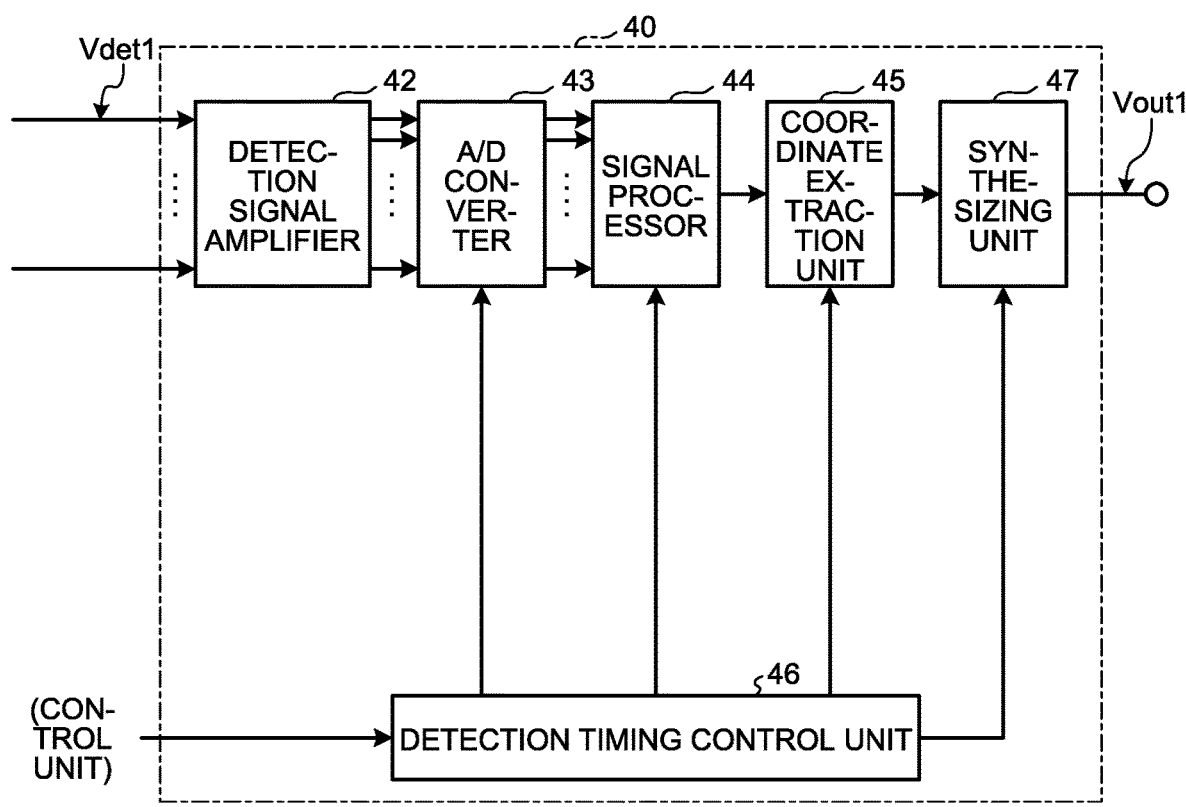
FIG. 2 is a block diagram illustrating a configuration example of a first detection unit.

FIG. 2 is a block diagram illustrating a configuration example of the first detection unit 40. The first detection unit 40 is a circuit that detects presence/absence of touch at small pitches on the basis of the control signal supplied from the control unit 11 and a first detection signal Vdet1 supplied from the fingerprint sensor unit 20. The first detection unit 40 includes, for example, a detection signal amplifier 42, an A/D converter 43, a signal processor 44, a coordinate extraction unit 45, and a synthesizing unit 47. A detection timing control unit 46 controls the A/D converter 43, the signal processor 44, the coordinate extraction unit 45, and the synthesizing unit 47 to be operated in synchronization with one another on the basis of the control signal supplied from the control unit 11.

The detection signal amplifier 42 amplifies the first detection signal Vdet1 supplied from the fingerprint sensor unit 20. The detection signal amplifier 42 may include an analog low-pass filter (LPF) that is a low-pass analog filter that removes a high-frequency component (noise component) included in the first detection signal Vdet1 and outputs the result.

The A/D converter 43 samples the analog signal output from the detection signal amplifier 42 at timing synchronized with the first drive signal Vf and converts it into a digital signal.

The signal processor 44 includes a digital filter that decreases frequency components (noise components) contained in an output signal of the A/D converter 43 and the frequency components other than the frequency at which the first drive signal Vf is sampled. The signal processor 44 is a logical circuit that detects presence/absence of touch to the fingerprint sensor unit 20 on the basis of the output signal of the A/D converter 43.

The coordinate extraction unit 45 is a logical circuit that obtains detection coordinates of touch when the touch is detected in the signal processor 44. The coordinate extraction unit 45 outputs the detection coordinates to the synthesizing unit 47. The synthesizing unit 47 generates two-dimensional information that indicates the shape of the object coming in contact or close by combining the first detection signals Vdet1 output from each first electrode of the fingerprint sensor unit 20.

Figure 3:
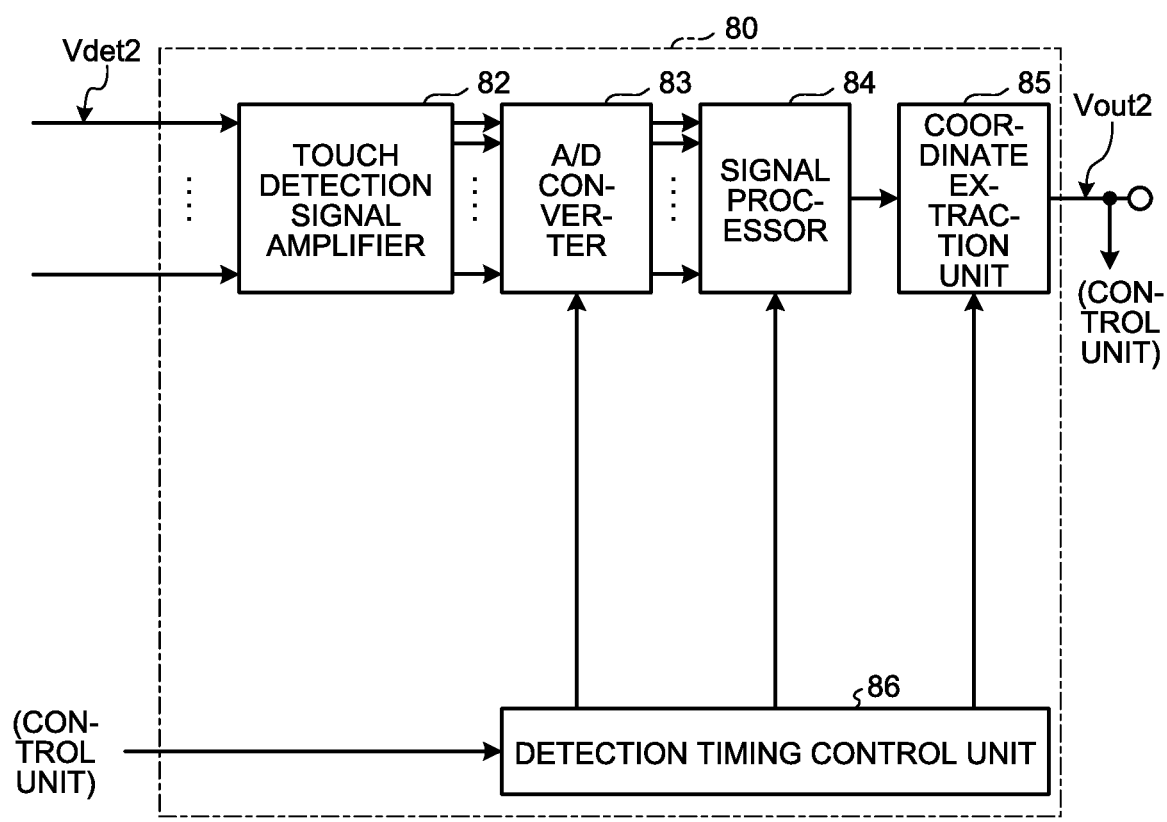
FIG. 3 is a block diagram illustrating a configuration example of a second detection unit.

FIG. 3 is a block diagram illustrating a configuration example of a second detection unit. The second detection unit 80 is a circuit that detects presence/absence of touch on the basis of the control signal supplied from the control unit 11 and a second detection signal Vdet2 supplied from the touch sensor unit 30. The second detection unit 80 includes, for example, a touch detection signal amplifier 82, an A/D converter 83, a signal processor 84, and a coordinate extraction unit 85. A detection timing control unit 86 controls the A/D converter 83, the signal processor 84, and the coordinate extraction unit 85 to be operated in synchronization with one another on the basis of the control signal supplied from the control unit 11. Operations of the touch detection signal amplifier 82, the A/D converter 83, the signal processor 84, and the coordinate extraction unit 85 are similar to those of the detection signal amplifier 42, the A/D converter 43, the signal processor 44, and the coordinate extraction unit 45. The signal processor 84 is a logical circuit that detects presence/absence of touch to the touch sensor unit 30, and the second detection unit 80 outputs a detection result of the presence/absence of touch to the touch sensor unit 30 to the control unit 11.

Figure 4:
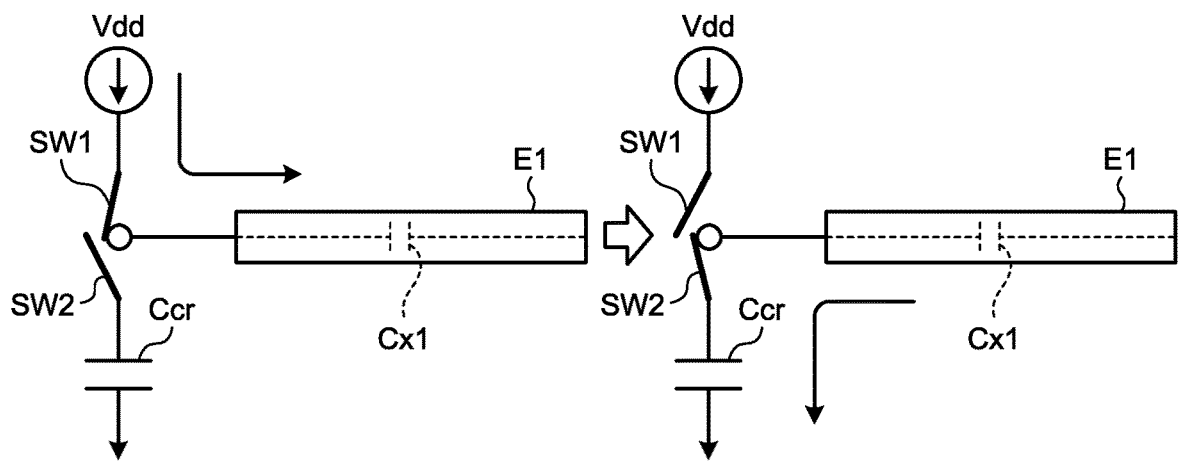
FIG. 4 is an explanatory view illustrating a state in which a finger is not in contact or close, for describing a basic principle of touch detection in a self-capacitance system.
Figure 5:
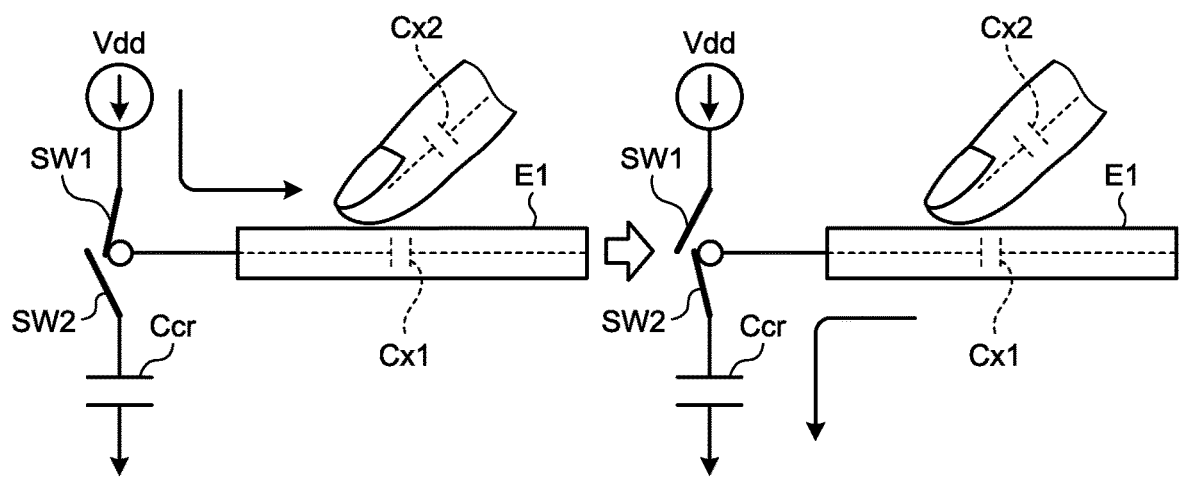
FIG. 5 is an explanatory view illustrating a state in which a finger is in contact or close, for describing a basic principle of touch detection in the self-capacitance system.
Figure 6:
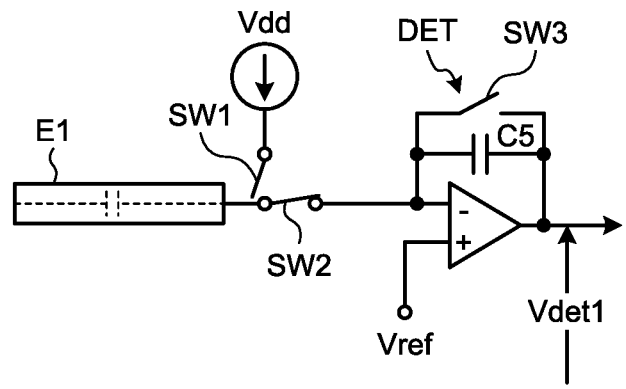
FIG. 6 is an explanatory view illustrating an example of an equivalent circuit of touch detection in the self-capacitance system.
Figure 7:
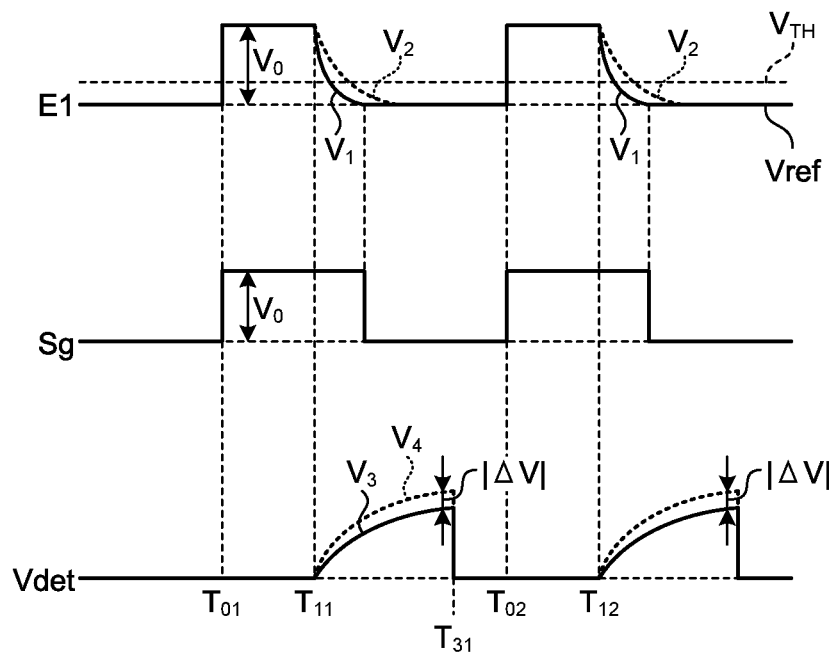
FIG. 7 is a diagram illustrating an example of waveforms of a drive signal and a touch detection signal of touch detection in the self-capacitance system.

As described above, the fingerprint sensor unit 20 and the touch sensor unit 30 are operated on the basis of a basic principle of capacitance-type touch detection. The basic principle of touch detection in the self-capacitance system will be described with reference to FIGS. 4 to 7. FIG. 4 is an explanatory view illustrating a state in which a finger is not in contact or close, for describing the basic principle of the touch detection in the self-capacitance system. FIG. 5 is an explanatory view illustrating a state in which a finger is in contact or close, for describing the basic principle of the touch detection in the self-capacitance system. FIG. 6 is an explanatory view illustrating an example of an equivalent circuit of the touch detection in the self-capacitance system. FIG. 7 is a diagram illustrating an example of waveforms of a drive signal and a touch detection signal of the touch detection in the self-capacitance system.

The left diagram of FIG. 4 illustrates a state in which a power supply Vdd and a detection electrode E1 are coupled by a switch SW1, and the detection electrode E1 is not coupled with a capacitor Ccr by a switch SW2 in the state where a finger is not in contact or close. In this state, a capacitance Cx1 included by the detection electrode E1 is charged. The right diagram of FIG. 4 illustrates a state in which the power supply Vdd and the detection electrode E1 are discoupled by the switch SW1, and the detection electrode E1 and the capacitor Ccr are coupled by the switch SW2. In this state, a charge of the capacitance Cx1 is discharged through the capacitor Ccr.

The left diagram of FIG. 5 illustrates a state in which the power supply Vdd and the detection electrode E1 are coupled by the switch SW1, and the detection electrode E1 is not coupled with the capacitor Ccr by the switch SW2 in the state where a finger is in contact or close. In this state, a capacitance Cx2 caused by the finger coming close to the detection electrode E1 is charged, in addition to the capacitance Cx1 included by the detection electrode E1. The right diagram of FIG. 5 illustrates a state in which the power supply Vdd and the detection electrode E1 are discoupled by the switch SW1, and the detection electrode E1 and the capacitor Ccr are coupled by the switch SW2. In this state, the charge of the capacitance Cx1 and the charge of the capacitance Cx2 are discharged through the capacitor Ccr.

Because of existence of the capacitance Cx2, voltage change characteristics of the capacitor Ccr at the time of discharge (the state in which a finger is in contact or close) illustrated in the right diagram of FIG. 5 are clearly different from voltage change characteristics of the capacitor Ccr at the time of discharge (in the state where a finger is not in contact or close) illustrated in the right diagram of FIG. 4. Therefore, in the self-capacitance system, presence/absence of an operation input of a finger or the like is determined using the voltage change characteristics of the capacitor Ccr are different depending on the presence/absence of the capacitance Cx2.

To be specific, an alternating current square wave Sg (see FIG. 7) of a predetermined frequency (for example, about several to several hundreds of kHz) is applied to the detection electrode E1. A voltage detector DET illustrated in FIG. 6 converts variation of a current according to the alternating current square wave Sg into variation of a voltage (waveforms $V_3$ and $V_4$).

As described above, the detection electrode E1 can be detached by the switch SW1 and the switch SW2. In FIG. 7, at timing of time $T_{01}$, the alternating current square wave Sg raises a voltage level corresponding to a voltage $V_0$. At this time, the switch SW1 is ON and the switch SW2 is OFF. Therefore, the voltage of the detection electrode E1 rises to the voltage $V_0$. Next, the switch SW1 is turned OFF before timing of time $T_{11}$. At this time, while the detection electrode E1 is in a floating state, the potential $V_0$ of the detection electrode E1 is maintained by the capacitance Cx1 (see FIG. 4) of the detection electrode E1, or a capacitance (Cx1+Cx2, see FIG. 5) that is obtained by adding the capacitance Cx2 due to the contact or approach of the finger or the like to the capacitance Cx1 of the detection electrode E1. Further, a switch SW3 is turned ON before the timing of time $T_{11}$ and is turned OFF after the lapse of a predetermined time, so that the voltage detector DET is reset. With this reset operation, an output voltage becomes a voltage approximately equivalent to Vref.

Following that, when the switch SW2 is turned ON at the timing of time $T_{11}$, an inverting input portion of the voltage detector DET becomes the voltage $V_0$ of the detection electrode E1, and then, the inverting input portion of the voltage detector DET is decreased to the reference voltage Vref according to time constants of the capacitance Cx1 (or Cx1+Cx2) of the detection electrode E1 and a capacitance C5 in the voltage detector DET. At this time, the charge accumulated in the capacitance Cx1 (or Cx1+Cx2) or the detection electrode E1 is moved to the capacitance C5 in the voltage detector DET, and thus an output of the voltage detector DET rises (Vdet). The output (Vdet) of the voltage detector DET becomes a waveform $V_3$ illustrated by the solid line when the finger or the like is not close to the detection electrode E1, and Vdet=Cx1×$V_0$/C5 is established. When the capacitance due to an influence of the finger or the like is applied, the output (Vdet) becomes a waveform $V_4$ illustrated by the dotted line, and Vdet=(Cx1+Cx2)×$V_0$/C5 is established.

Following that, the switch SW2 is turned OFF and the switch SW1 and the switch SW3 are turned ON at timing of time $T_{31}$ after the charge of the capacitance Cx1 (or Cx1+Cx2) of the detection electrode E1 is sufficiently moved to the capacitance C5, so that the potential of the detection electrode E1 is decreased to a low level that is the same potential as the alternating current square wave Sg and the voltage detector DET is reset. At this time, timing to turn ON the switch SW1 may be any timing as long as the timing is after the switch SW2 is turned OFF and on or before time $T_{02}$. Timing to reset the voltage detector DET may be any timing as long as the timing is after the switch SW2 is turned OFF and on or before time $T_{12}$. The above operation is repeated at a predetermined frequency (for example, about several to several hundreds of kHz). Presence/absence of an external proximity object (presence/absence of touch) can be measured on the basis of an absolute value $|\Delta V|$ that is a difference between the waveform $V_3$ and the waveform $V_4$. As illustrated in FIG. 7, the potential of the detection electrode E1 becomes a waveform of $V_1$ when the finger or the like is not close, and becomes a waveform of $V_2$ when the capacitance Cx2 due to an influence of the finger or the like is applied.

Figure 8:
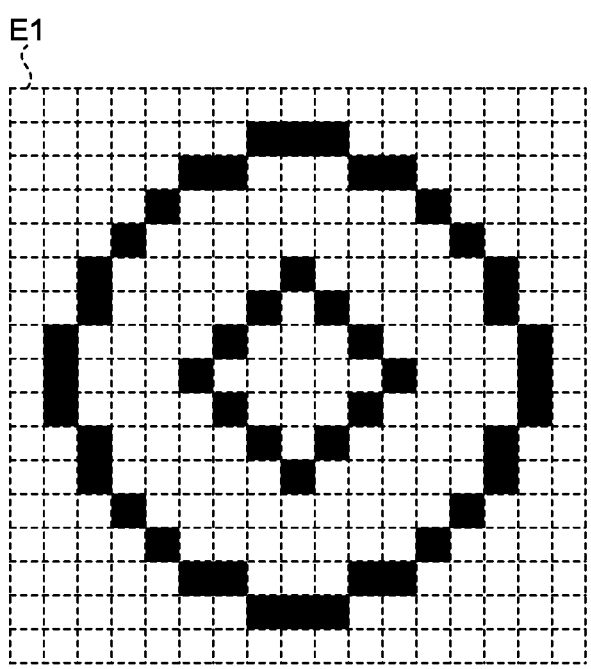
FIG. 8 is a schematic view illustrating a mechanism of fingerprint detection by the first detection unit.

FIG. 8 is a schematic view illustrating a mechanism of fingerprint detection by the first detection unit 40. The synthesizing unit 47 generates the two-dimensional information that indicates the shape of the external proximity object coming in contact with or close to the detection electrode E1 by combining the detection signals Vdet from a plurality of the detection electrodes E1. To be specific, the synthesizing unit 47 generates a two-dimensional image that indicates a difference in detection intensity as intensity of color (for example, gray scale), and the difference in the detection intensity appears according to a difference in the degree of contact to the cover member 10 (see FIG. 1) caused by the unevenness held by the external proximity object (for example, the finger of a human or the like). An output Vout1 of the first detection unit 40 including the synthesizing unit 47 is an output of the above-described two-dimensional information, for example.

FIG. 8 exemplarily illustrates two-gradation detection that indicates only presence/absence of contact or approach, for the purpose of clarification. However, in reality, detection results in the blocks can have multi-gradation. Further, in FIG. 8, the detected external proximity object is an object having projections in double circle manner. However, in a case where the external proximity object is the finger of a human having a fingerprint, the fingerprint appears as the two-dimensional information. The function of the synthesizing unit 47 may be included by a configuration other than the first detection unit 40. For example, the output Vout1 of the first detection unit 40 may be an output of the coordinate extraction unit 45, and an external configuration may generate the two-dimensional information on the basis of the output Vout1. The configuration regarding the generation of the two-dimensional information may be realized by hardware such as a circuit or by so-called software processing.

In the second detection unit 80 illustrated in FIG. 1, the signal processor 84 performs processing of taking out only a difference between detection signals by the finger. A signal of the difference by the finger is the above-described absolute value $|\Delta V|$ that is the difference between the waveform $V_3$ and the waveform $V_4$. The signal processor 84 may perform averaging the absolute value $|\Delta V|$ per one detection block, and obtain an average value of the absolute values $|\Delta V|$. Accordingly, the signal processor 84 can decrease an influence due to noises. The signal processor 84 compares the signal of the detected difference by the finger with a predetermined threshold voltage, and determines that the external proximity object is in a non-contact state if the signal is less than the threshold voltage. Meanwhile, the signal processor 84 compares the signal of the detected difference due to the finger with the predetermined threshold voltage, and determines that the external proximity object is in a contact state if the signal is the threshold voltage or more. The coordinate extraction unit 85 is a logical circuit that obtains coordinates when the touch is detected by the signal processor 84. The coordinate extraction unit 85 outputs the coordinates as a detection signal output Vout2. As described above, the second detection unit 80 can detect the touch on the basis of the second detection signal Vdet2 supplied from the touch sensor unit 30.

Figure 9:
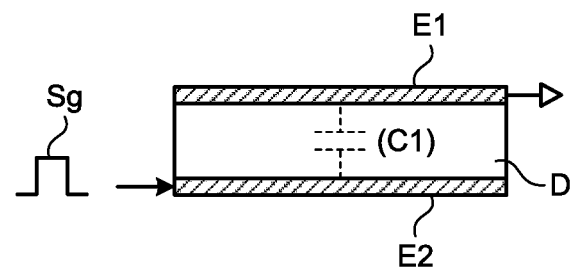
FIG. 9 is an explanatory view illustrating a state in which a finger is not in contact or close, for describing a basic principle of touch detection in a mutual capacitance system.
Figure 10:
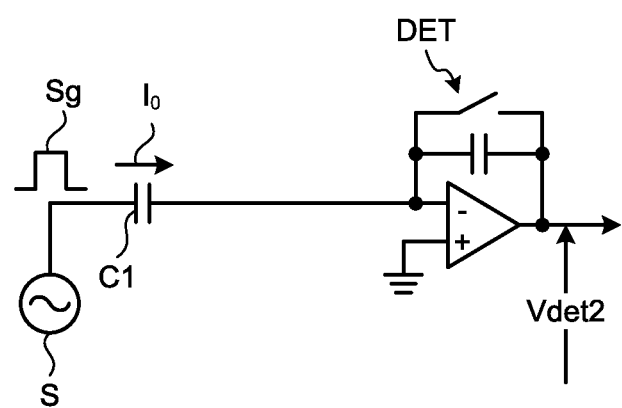
FIG. 10 is an explanatory view illustrating an example of an equivalent circuit of the state in which a finger illustrated in FIG. 9 is not in contact or close.
Figure 11:
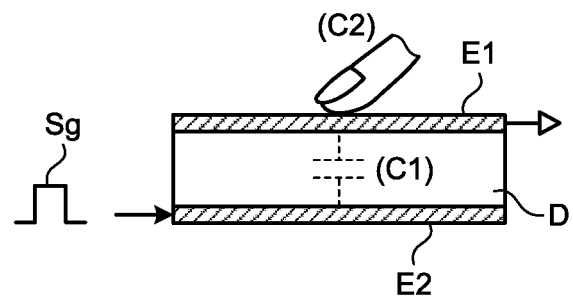
FIG. 11 is an explanatory view illustrating a state in which a finger is in contact or close, for describing a basic principle of touch detection in the mutual capacitance system.
Figure 12:
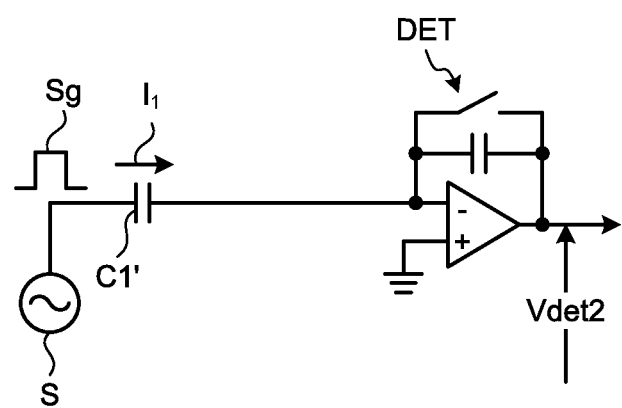
FIG. 12 is an explanatory view illustrating an example of an equivalent circuit of the state in which a finger is in contact or close illustrated in FIG. 11.
Figure 13:
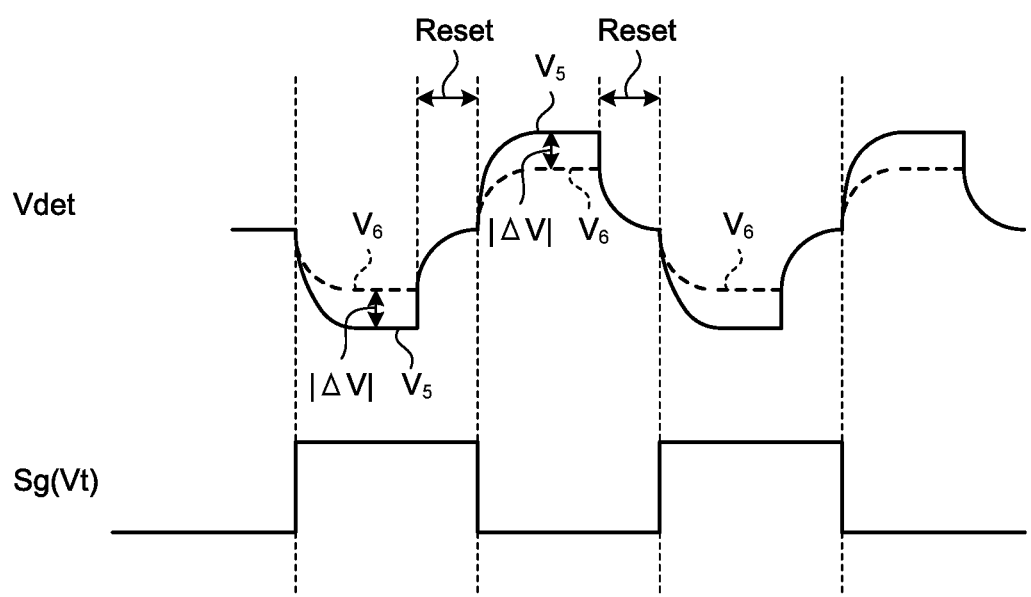
FIG. 13 is a diagram illustrating an example of waveforms of a drive signal and a touch detection signal of touch detection in the mutual capacitance system.

Next, a basic principle of touch detection in the mutual capacitance system of the detection device 1 of the present embodiment will be described with reference to FIGS. 9 to 13. FIG. 9 is an explanatory view illustrating a state in which a finger is not in contact or close, for describing a basic principle of touch detection in the mutual capacitance system. FIG. 10 is an explanatory view illustrating an equivalent circuit of the state in which a finger is not in contact or close illustrated in FIG. 9. FIG. 11 is an explanatory view illustrating a state in which a finger is in contact or close, for describing a basic principle of the touch detection in the mutual capacitance system. FIG. 12 is an explanatory view illustrating an example of an equivalent circuit of the state in which a finger is in contact or close illustrated in FIG. 11. FIG. 13 is a diagram illustrating an example of waveforms of a drive signal and a touch detection signal of the touch detection in the mutual capacitance system.

For example, as illustrated in FIG. 9, a capacitance element C1 includes a pair of a detection electrode E1 and a drive electrode E2 arranged to face each other with a dielectric body D interposed therebetween. As illustrated in FIG. 10, the capacitance element C1 has one end coupled with an alternating current signal source (drive signal source) S, and the other end coupled with a voltage detector DET. The voltage detector DET is an integrating circuit included in the touch detection signal amplifier 82 illustrated in FIG. 3, for example.

When an alternating current square wave Sg of a predetermined frequency (for example, about several to several hundreds of kHz) is applied to the drive electrode E2 (the one end of the capacitance element C1) from the alternating current signal source S, an output waveform (detection signal Vdet) as illustrated in FIG. 13 appears through the voltage detector DET coupled to the detection electrode E1 (the other end of the capacitance element C1) side. The alternating current square wave Sg corresponds to the second drive signal Vt input from the second electrode driver 14.

In the state in which a finger is not in contact or close (non-contact state), a current $I_0$ according to a capacitance value of the capacitance element C1 flows along with charge to/discharge from the capacitance element C1, as illustrated in FIGS. 9 and 10. The voltage detector DET illustrated in FIG. 10 converts variation of the current $I_0$ according to the alternating current square wave Sg into variation of a voltage (a waveform $V_5$ in the solid line (see FIG. 13)).

Meanwhile, in the state in which a finger is in contact or close (contact state), a capacitance C2 generated by the finger is in contact with or close to the detection electrode E1, as illustrated in FIG. 11, and thus a capacitance of fringe between the drive electrode E2 and the detection electrode E1 is shielded. Therefore, as illustrated in FIG. 12, the capacitance element C1 functions as a capacitance element C1' having a smaller capacitance value than the capacitance value in the non-contact state. Then, in the equivalent circuit illustrated in FIG. 12, a current $I_1$ flows in the capacitance element C1'. As illustrated in FIG. 13, the voltage detector DET converts variation of the current $I_1$ according to the alternating current square wave Sg into variation of a voltage (a waveform $V_6$ in the dotted line). In this case, the waveform $V_6$ has smaller amplitude than the above-described waveform $V_5$. Accordingly, an absolute value $|\Delta V|$ of a voltage difference between the waveform $V_5$ and the waveform $V_6$ is changed according to an influence of a conductor such as the finger coming in contact or close from an outside. The voltage detector DET preferably performs an operation provided with a period Reset in which charge/discharge of the capacitor is reset in accordance with a frequency of the alternating current square wave Sg by switching in the circuit, in order to accurately detect the absolute value $|\Delta V|$ of the voltage difference between the waveform $V_5$ and the waveform $V_6$.

In the second detection unit 80 illustrated in FIG. 1, the signal processor 84 performs processing of taking out an absolute value $|\Delta V|$ of a difference between the detection signals by the finger, that is, the difference between the waveform $V_5$ and the waveform $V_6$. The signal processor 84 compares a signal of the detected difference by the finger with a predetermined threshold voltage, and determines that the external proximity object is in the non-contact state if the signal is less than the threshold voltage. Meanwhile, the signal processor 84 compares the signal of the detected difference by the finger with the predetermined threshold voltage, and determines that the external proximity object is in the contact state if the signal is the threshold voltage or more. In this way, the second detection unit 80 can detect the touch in the mutual capacitance system on the basis of the second detection signal Vdet2 supplied from the touch sensor unit 30.

Figure 14:
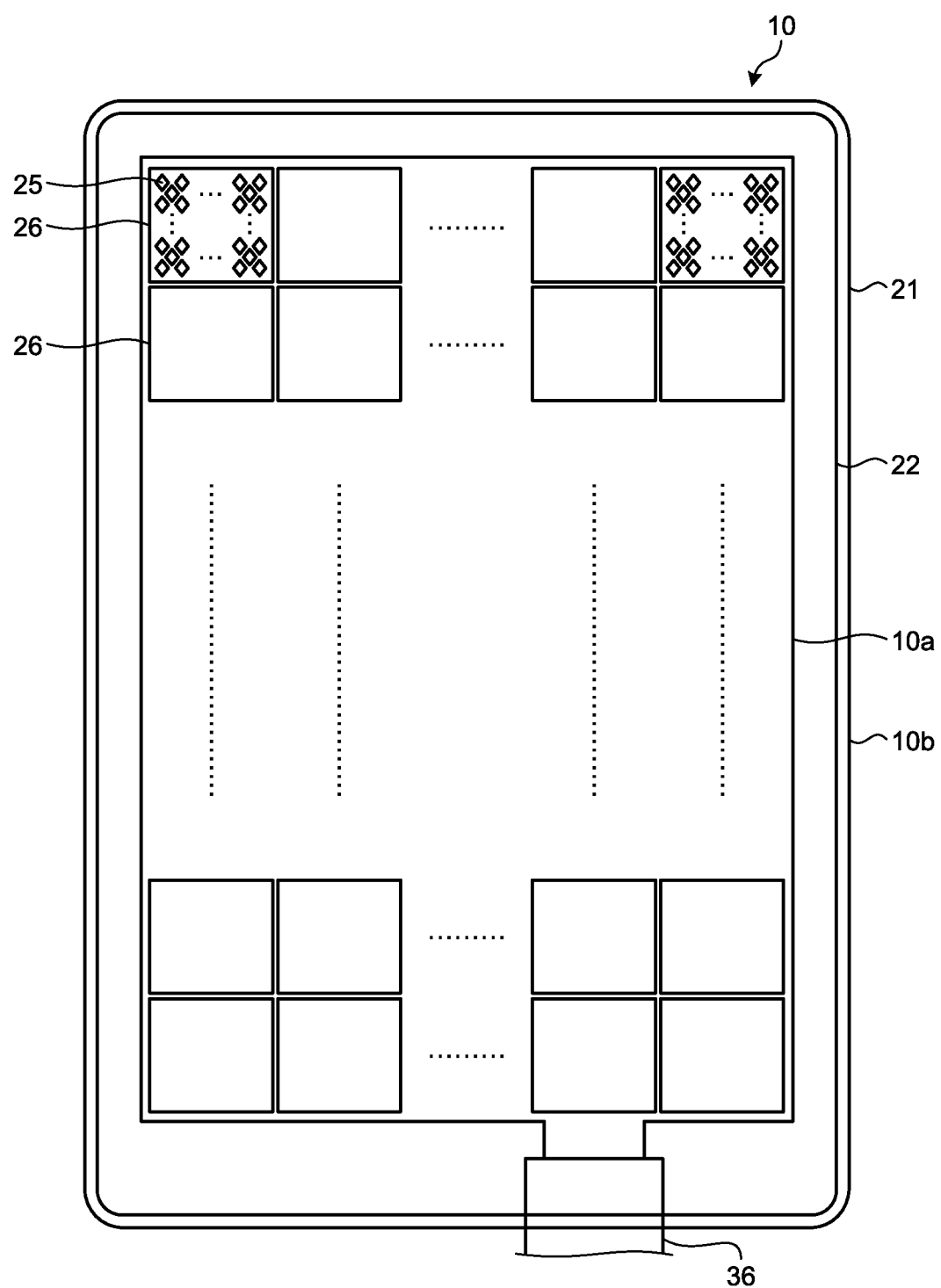
FIG. 14 is a plan view of the cover member according to the first embodiment.
Figure 15:
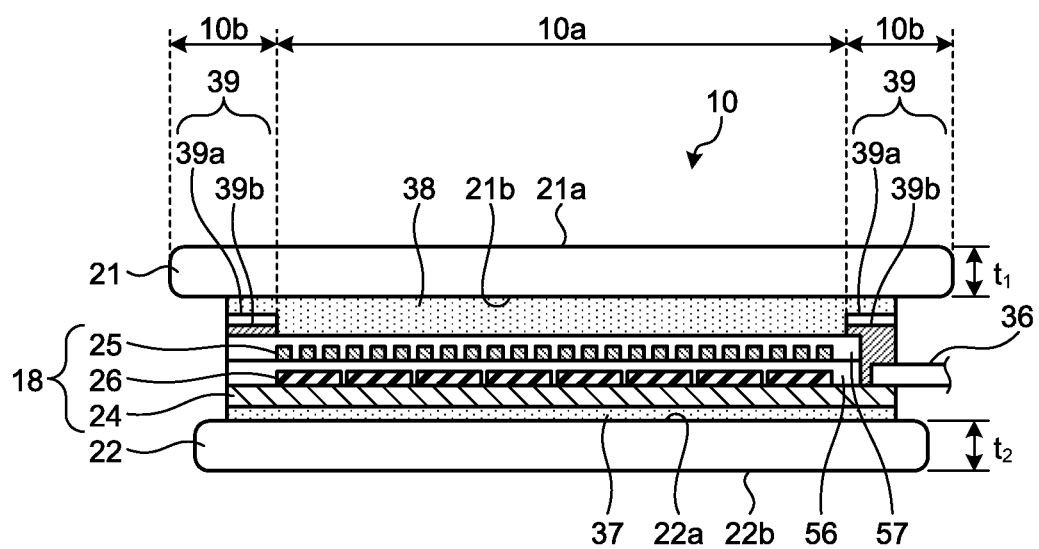
FIG. 15 is a sectional view illustrating a schematic sectional structure of the cover member according to the first embodiment.

Next, a configuration example of the cover member 10 will be described in detail. FIG. 14 is a plan view of the cover member according to the first embodiment. FIG. 15 is a sectional view illustrating a schematic sectional structure of the cover member according to the first embodiment.

As illustrated in FIGS. 14 and 15, the cover member 10 includes a first substrate 21, a second substrate 22 facing the first substrate 21, and a sensor unit 18 provided between the first substrate 21 and the second substrate 22. The first substrate 21 includes a transmissive region 10*a* having a transmitting property for allowing an image displayed by an external liquid crystal display device or the like to be visually recognized, and a frame region 10*b* outside the transmissive region 10*a*. A decorative layer 39 and a flexible substrate 36 are provided in positions overlapped with the frame region 10*b* of the sensor unit 18. The decorative layer 39 is a colored layer having smaller light transmittance than the first substrate 21, and can suppress visual recognition of wires, circuits, and the like provided in the frame region 10*b*. The decorative layer 39 includes a second decorative layer 39*b* as a ground layer for suppressing leakage of light to the frame region 10*b*, and a first decorative layer 39*a* as a colored layer provided on the second decorative layer 39*b*. The configuration of the decorative layer 39 is not limited thereto, and may be a single layer or three or more layers.

One surface of the first substrate 21 is a detection surface 21*a* for detecting the fingerprint of the finger coming in contact or close. A surface on an opposite side of the detection surface 21*a* is an adhesion surface 21*b* for bonding the sensor unit 18 through an adhesive layer 38. The second substrate 22 is arranged to face the adhesion surface 21*b* of the first substrate 21. The sensor unit 18 is bonded to one surface 22*a* of the second substrate 22 with an adhesive layer 37 interposed therebetween. The other surface 22*b* on an opposite side of the one surface 22*a* of the second substrate 22 is a surface attached to a display surface of an electronic apparatus such as an external liquid crystal display device. The first substrate 21 and the second substrate 22 are reinforced glass or alkali glass. As the reinforced glass, chemically reinforced glass having a compressive stress layer on a surface, the compressive stress layer being formed by replacing a sodium (Na) ion on the surface of the glass with a potassium (K) ion having a larger ion radius, or reinforced glass having a compressive stress layer on a surface, the compressive stress layer being formed by sending the air to rapidly cool a heated glass substrate can be used, for example. The first substrate 21 and the second substrate 22 may be six-surface reinforced glass.

As illustrated in FIG. 15, the sensor unit 18 includes a sensor base material 24, a first electrode 25, and a second electrode 26. The sensor base material 24 is a film-like base material made of a polyimide resin. The second electrode 26 is provided on the sensor base material 24. The first electrode 25 is provided above the second electrode 26 with an insulating layer 56 interposed therebetween. An insulating layer 57 is provided on the first electrode 25 for protecting the first electrode 25.

The first electrode 25 is a detection electrode of the fingerprint sensor unit 20 (see FIG. 1), and corresponds to the detection electrode E1 in the detection principle in the capacitance type. The fingerprint of the finger coming in contact with or close to the detection surface 21*a* can be detected on the basis of the detection principle in the self-capacitance system according to capacitance change of the first electrode 25 of the sensor unit 18. The second electrode 26 is a detection electrode of the touch sensor unit 30 (see FIG. 1), and corresponds to the detection electrode E1 in the detection principle of the capacitance type. The touch input coordinates of the conductor coming in contact with or close to the detection surface 21*a* can be detected on the basis of the detection principle in the self-capacitance system according to the capacitance of the second electrode 26 of the sensor unit 18. As described above, in the sensor unit 18, the fingerprint sensor unit 20 that detects the fingerprint of the finger and the touch sensor unit 30 that detects the touch input are integrated.

As illustrated in FIG. 14, a plurality of the second electrodes 26 is arranged in a matrix manner in a direction along a long side of the transmissive region 10*a* and a direction along a short side of the transmissive region 10*a*. Each of the plurality of second electrodes 26 has a square shape. A plurality of the first electrodes 25 is provided to be overlapped with the second electrodes 26 in the transmissive region 10*a*. The first electrodes 25 have a rhombic shape, and are arranged such that sides of the rhombic shapes face each other. The first electrode 25 has a smaller area than the second electrode 26, and a large number of the first electrodes 25 is provided to be overlapped with one second electrode 26. FIG. 14 illustrates only a part of the first electrodes 25 and a part of the second electrodes 26 for simplicity of the drawing. However, the first electrodes 25 and the second electrodes 26 may be provided in the entire transmissive region 10*a*. The first electrodes 25 may be provided in positions overlapped with a part of the second electrodes 26. As the first electrodes 25 and the second electrodes 26, a light-transmitting conductive material such as indium tin oxide (ITO) can be used.

The first electrode 25 of the sensor unit 18 detects the fingerprint on the basis of change of the capacitance by fine unevenness in the surface of the finger. To obtain favorable detection sensitivity, the first electrode 25 is favorably arranged at a position close to the detection surface 21*a*. For example, in a case where only one sheet of the glass substrate for protecting the sensor unit 18 is provided on an upper surface, the glass substrate is preferably made thinner to obtain the favorable detection sensitivity. To be specific, the thickness of the glass substrate is preferably 0.3 mm or less. Meanwhile, typically, if the thickness of the glass substrate becomes 0.5 mm or less, the glass substrate becomes easily damaged.

In the cover member 10 of the present embodiment, a thickness $t_1$ of the first substrate 21 illustrated in FIG. 15 is $t_1$=0.25 mm and a thickness $t_2$ of the second substrate 22 illustrated in FIG. 15 is $t_2$=0.25 mm. The first substrate 21 and the second substrate 22 have the same thickness, and ones having the thickness thinner than 0.5 mm are used. The two glass substrates of the first substrate 21 and the second substrate 22 are provided, the sensor unit 18 is arranged between the first substrate 21 and the second substrate 22, and the pair of the substrates is bonded with the sensor unit 18 interposed therebetween. Therefore, even if the thicknesses of the first substrate 21 and the second substrate 22 are made thinner than 0.5 mm, respectively, the cover member 10 is formed in so-called a laminated glass manner, and as a result, the strength of the cover member 10 can be maintained. The thickness of the first substrate 21 provided on the detection surface 21a side can be made thin up to 0.25 mm with respect to the first electrodes 25, and thus the distance between the first electrodes 25 and the surface of the finger to be detected becomes close, and the favorable detection sensitivity can be obtained. As described above, according to the cover member 10 of the present embodiment, the favorable detection sensitivity can be obtained while suppressing damage. The thicknesses of the first substrate 21 and the second substrate 22 are preferably 0.3 mm or less, and preferably 0.2 mm to 0.3 mm.

The first substrate 21 and the second substrate 22 preferably have the same linear expansion coefficient. The linear expansion coefficient of the first substrate 21 and the second substrate 22 is, for example, $30 \times 10^{-7}/° C.$ to $95 \times 10^{-7}/° C.$ The same glass material is preferably used for the first substrate 21 and the second substrate 22. According to this configuration, even if expansion/contraction of the glass substrates is caused due to temperature change of a use environment, both surfaces of the sensor unit 18 have a similar displacement amount, and thus bending or deformation of the cover member 10 can be suppressed.

As the adhesive layer 38 that bonds the first substrate 21 and the sensor unit 18, and the adhesive layer 37 that bonds the second substrate 22 and the sensor unit 18, an optical adhesive film (optical clear adhesive (OCA)) is used, for example. The same material is preferably used for the adhesive layer 37 and the adhesive layer 38. If doing so, both surfaces of the sensor unit 18 have a similar displacement amount, and thus bending or deformation of the cover member 10 can be suppressed.

An embodiment is not limited to the above-described configuration, the second substrate 22 may be thicker than the first substrate 21. For example, the thickness $t_1$ of the first substrate 21 may be $t_1$=0.25 mm, and the thickness $t_2$ of the second substrate 22 may be thicker than 0.25 mm, and may be, for example, $t_2$=0.5 mm. In doing so, the distance between the first electrode 25 and the detection surface 21a can be made small and the preferable detection sensitivity can be obtained, and the total thickness of the first substrate 21 and the second substrate 22 is increased, so that the strength of the cover member 10 can be improved.

In the present embodiment, the decorative layer 39 is provided on the sensor unit 18 side, and thus damage of the first substrate 21 can be suppressed, compared with a case in which the decorative layer 39 is printed and formed on the first substrate 21. Misalignment of the position of the decorative layer 39 due to a bonding misalignment between the first substrate 21 and the sensor unit 18 does not occur. Therefore, the area of the decorative layer 39 can be made small. Accordingly, a narrow frame can be achieved.

Figure 16:
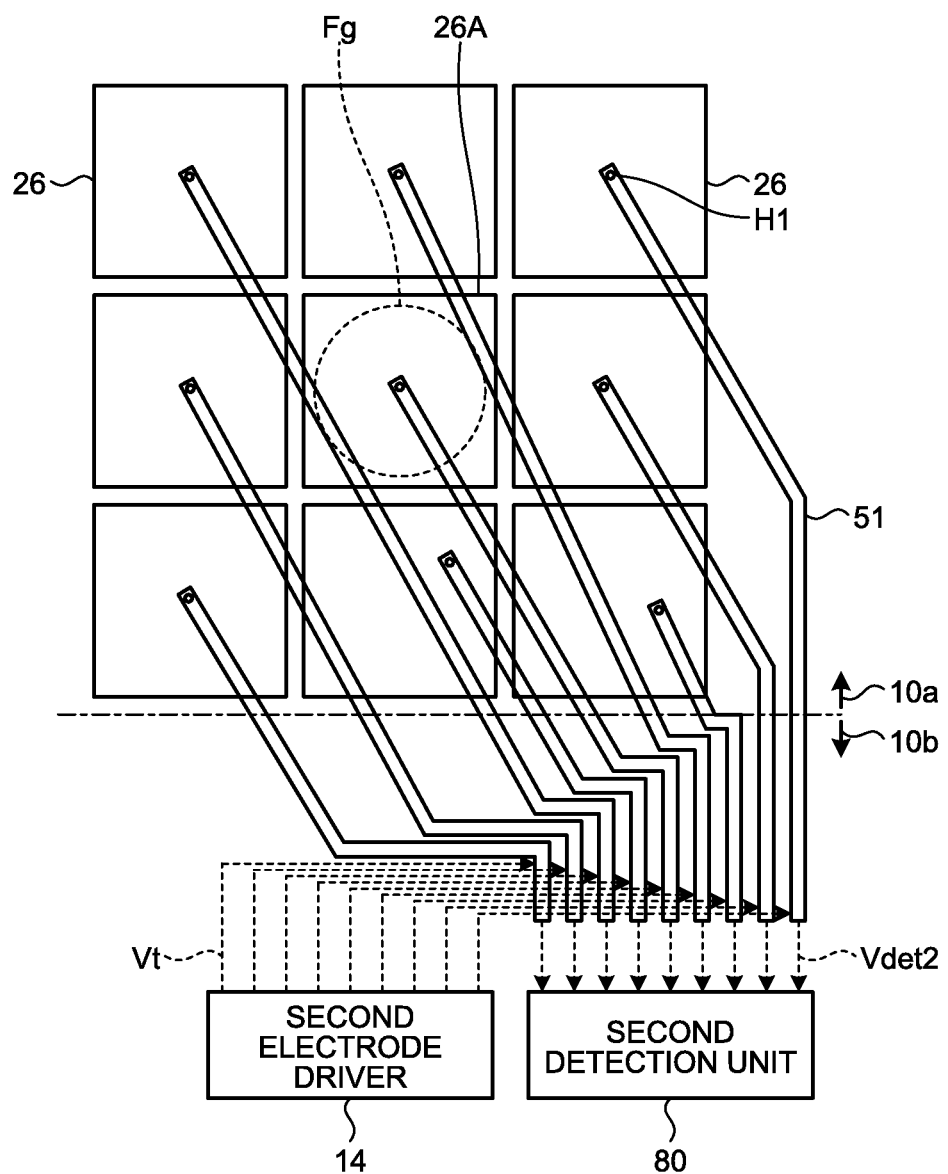
FIG. 16 is a plan view schematically illustrating an overall configuration of second electrodes and wires.

Next, detailed structures of the first electrode 25 and the second electrode 26 will be described. FIG. 16 is a plan view schematically illustrating an overall configuration of the second electrodes and wires. As illustrated in FIG. 16, the second electrodes 26 arranged in a matrix manner are coupled with conductive wires 51 through contact holes H1. In the present embodiment, one wire 51 is coupled with one second electrode 26. The wire 51 is inclined with respect to an array direction of a column direction of the second electrodes 26 in the transmissive region 10a, and is pulled out from the transmissive region 10a to the frame region 10b. The wire 51 is electrically coupled with the flexible substrate 36 (see FIGS. 14 and 15), and is coupled with a control circuit such as an external control IC (not illustrated).

The second drive signal Vt is supplied from the second electrode driver 14 to the wire 51. The second detection signal Vdet2 according to change of a self-capacitance of the second electrode 26 is supplied to the second detection unit 80 through the wire 51. Accordingly, the external conductor coming in contact with or close to the detection surface 21a can be detected on the basis of the touch detection principle in the self-capacitance system. The second drive signal Vt may be supplied to all of the second electrodes 26 at the same time, or may be sequentially supplied by providing a scanner circuit to the second electrode driver 14.

The wire 51 is made of at least one of metal materials of aluminum (Al), copper (Cu), silver (Ag), molybdenum (Mo), and alloy thereof. The wire 51 may be a laminated body in which a plurality of layers is laminated using one or more of the metal materials.

Figure 17:
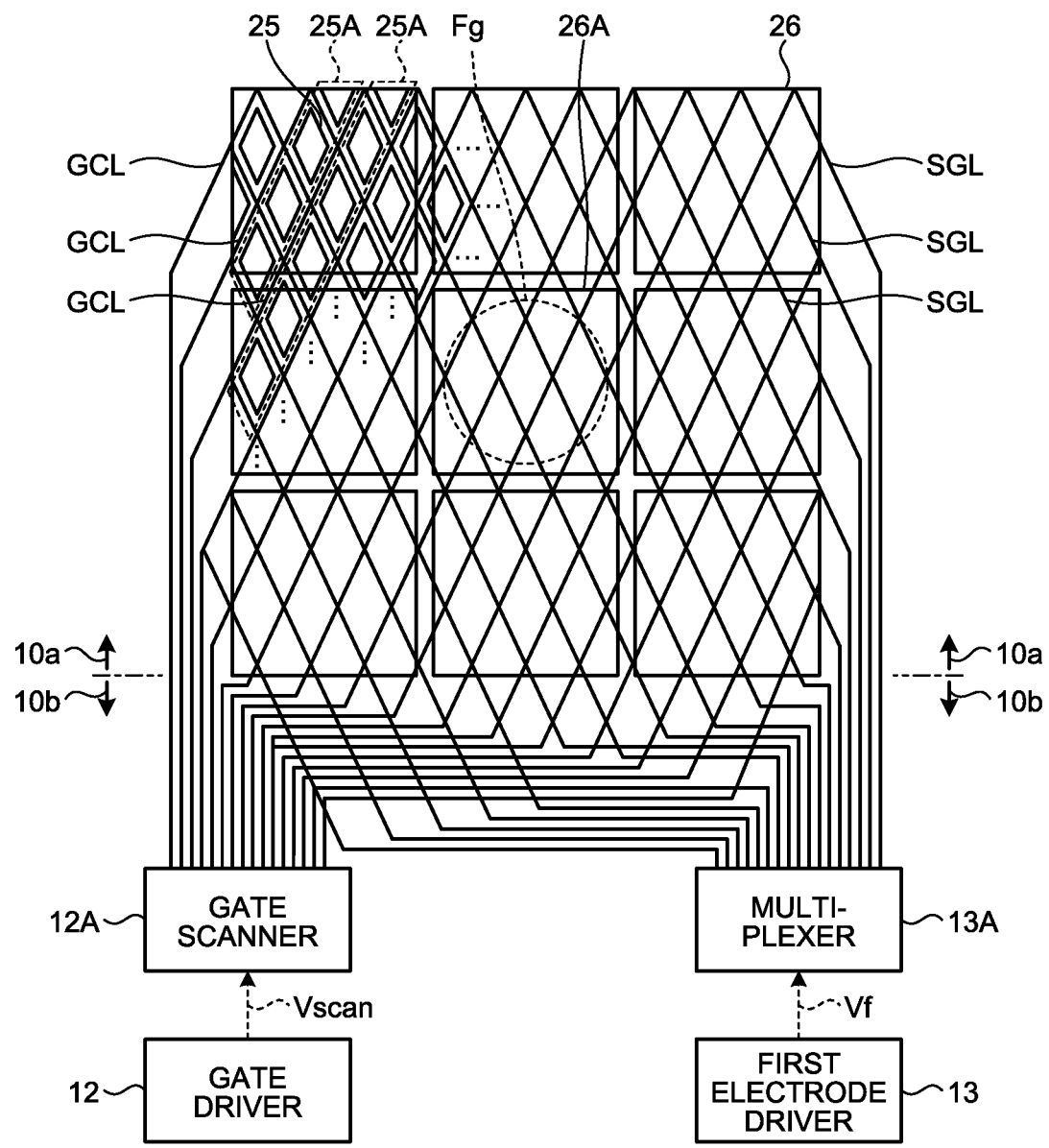
FIG. 17 is a plan view schematically illustrating an overall configuration of first electrodes, the second electrodes, gate lines, and data lines.
Figure 18:
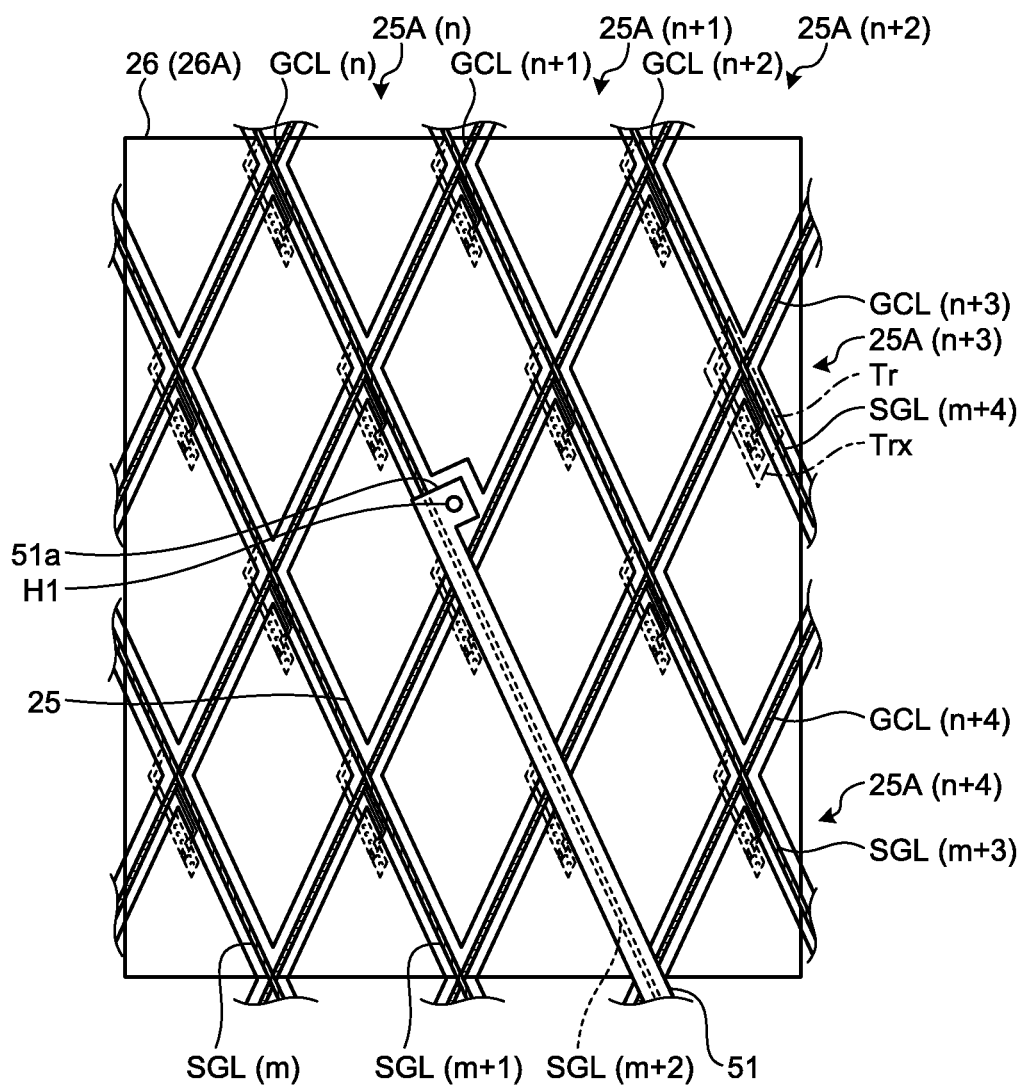
FIG. 18 is a schematic plan view illustrating a configuration of the first electrodes and wires regarding one second electrode.

FIG. 17 is a plan view schematically illustrating an overall configuration of the first electrodes, the second electrodes, gate lines, and data lines. FIG. 18 is a schematic plan view illustrating a configuration of the first electrodes and each wire regarding one second electrode. As illustrated in FIG. 17, a plurality of gate lines GCL and a plurality of data lines SGL are provided to be overlapped with the second electrodes 26. The gate lines GCL are inclined with respect to the array direction of the column direction of the second electrodes 26. The data lines SGL are inclined in an opposite direction to the gate lines GCL with respect to the array direction of the column direction of the second electrodes 26. The data lines SGL and the gate lines GCL are arranged to intersect with one another in a mesh manner. The rhombic-shaped first electrodes 25 are respectively provided in regions surrounded by the data lines SGL and the gate lines GCL. The first electrode 25 has a rhombic shape having four equal sides. However, the shape of the first electrode 25 is not limited thereto, and may be a parallelogram, for example.

As illustrated in FIG. 18, a first switching element Tr and a second switching element Trx are provided in an intersection of the data line SGL and the gate line GCL. The first switching element Tr and the second switching element Trx are provided at the position corresponding to the first electrode 25. The first switching element Tr can switch coupling and decoupling between the data line SGL and the first electrode 25. The second switching element Trx can switch coupling and decoupling between the first electrode 25 and the second electrode 26.

The first switching element Tr is configured of a thin film transistor. In this example, the first switching element Tr is configured of an n-channel metal oxide semiconductor (MOS)-type thin film transistor (TFT). The second switching element Trx performs a switching operation reverse to the first switching element Tr. In this example, the second switching element Trx is configured of a p-channel MOS-type TFT. The same scanning signal is supplied to the first switching element Tr and the second switching element Trx, and the first switching element Tr is ON (open) and the second switching element Trx is OFF (close) when the scanning signal is at a high level, for example. The first switching element Tr is OFF (close) and the second switching element Trx is ON (open) when the scanning signal is at a low level.

As illustrated in FIG. 17, the gate lines GCL are coupled with a gate scanner 12A provided in the frame region 10b. The gate scanner 12A sequentially selects the gate lines GCL. The gate driver 12 supplies the scanning signal Vscan to the gate line GCL selected by the gate scanner 12A. The first switching element Tr (see FIG. 18) are switched on and off by the scanning signal Vscan. The plurality of first electrodes 25 arrayed along the gate lines GCL is selected as first electrode blocks 25A to be detected, and the scanning signal Vscan of a high level is supplied to the first switching elements Tr corresponding to each first electrode 25 of the first electrode blocks 25A.

The data lines SGL are coupled with a multiplexer 13A provided in the frame region 10b. The multiplexer 13A sequentially selects the plurality of data lines SGL. The first electrode driver 13 supplies the first drive signal Vf to the selected data line SGL through the multiplexer 13A. Accordingly, the first drive signal Vf is supplied to each first electrode 25 of the first electrode blocks 25A to be detected through the data lines SGL and the first switching elements Tr. The fingerprint of the finger is detected on the basis of the capacitance change of each first electrode 25 by the first drive signal Vf.

The gate scanner 12A and the multiplexer 13A can be provided at positions overlapped with the frame region 10b of the sensor base material 24 (see FIG. 15). The frame region 10b of the cover member 10 has a larger area than the display device, and thus can be provided with the gate scanner 12A and the multiplexer 13A.

As illustrated in FIG. 18, the wire 51 coupled with the second electrode 26 is provided to be overlapped with the data line SGL, and is provided along the data line SGL. Therefore, visual recognition of the data line SGL can be suppressed. As illustrated in FIGS. 16 to 18, the wires 51, the data lines SGL, and the gate lines GCL are provided to be inclined with respect to the array direction of the second electrodes 26. That is, the wires 51, the data lines SGL, and the gate lines GCL are provided to intersect with a gap between the adjacent second electrodes 26. Therefore, moiré occurring at the second electrodes 26 and each wire is suppressed. When the cover member 10 is provided on the display device, the wires 51, the data lines SGL, and the gate lines GCL are inclined with respect to an array direction of pixels of the display device. Therefore, occurrence of the moiré is suppressed.

The cover member 10 of the present embodiment includes the touch sensor unit 30 and the fingerprint sensor unit 20 (see FIG. 1). Therefore, the positional coordinates of the finger detected by the touch sensor unit 30 are acquired by the control unit 11, and the fingerprint sensor unit 20 can detect the fingerprint at a spot corresponding to the positional coordinates. For example, in a case where contact or approach of a finger Fg is detected at a position overlapped with a second electrode 26A illustrated in FIG. 16, the first electrodes 25 at the position overlapped with the second electrode 26A are driven and the fingerprint is detected.

To be specific, the gate scanner 12A sequentially selects gate lines GCL(n), GCL(n+1), . . . and GCL(n+4) overlapped with the second electrode 26A illustrated in FIG. 18, and the gate driver 12 sequentially supplies the scanning signal Vscan to the selected gate lines GCL(n), GCL(n+1), . . . and GCL(n+4). The multiplexer 13A sequentially selects data lines SGL(m), SGL(m+1), . . . and SGL(m+4) overlapped with the second electrode 26A, and the first electrode driver 13 supplies the first drive signal Vf to the selected data lines SGL(m), SGL(m+1), . . . and SGL(m+4). Accordingly, the first drive signal Vf is supplied to the first electrodes 25 overlapped with the second electrode 26A, and the fingerprint can be detected at the position where the finger Fg comes in contact or close.

Figure 19:
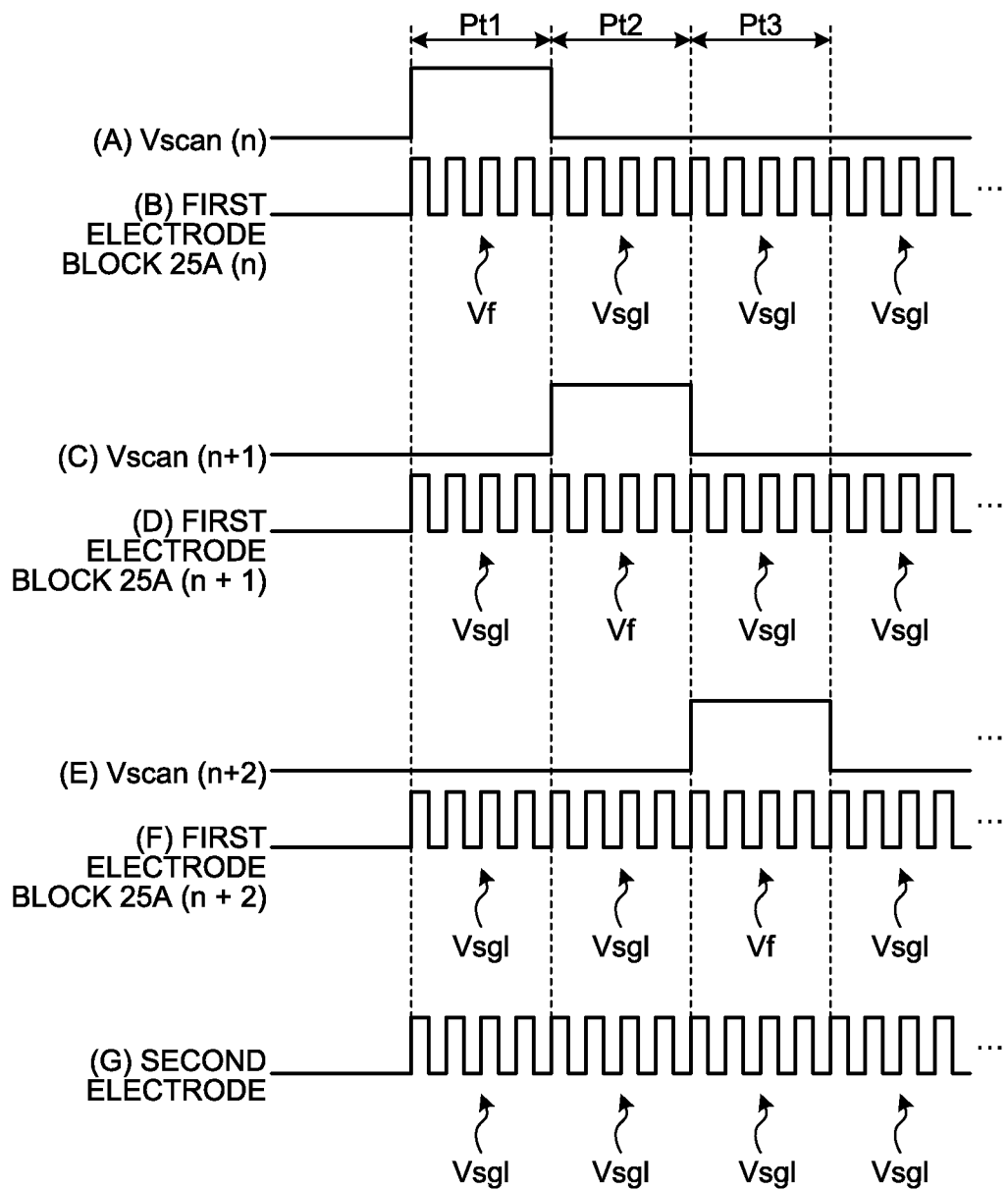
FIG. 19 is timing waveform charts of a detection device including the cover member according to the first embodiment.

FIG. 19 is timing waveform charts of the detection device including the cover member according to the first embodiment. FIG. 19 illustrates an example of the fingerprint detection operation of the fingerprint sensor unit 20. As illustrated in FIG. 19, detection periods Pt1, Pt2, Pt3, . . . are arranged in time division. In the detection period Pt1, the n-th gate line GCL(n) is selected, and a scanning signal Vscan(n) is turned ON (high level). The first switching elements Tr coupled with the n-th gate line GCL(n) are supplied with the scanning signal Vscan(n) and are turned ON (open). Accordingly, the first drive signal Vf is supplied to each first electrode 25 of first electrode blocks 25A(n) corresponding to the gate line GCL(n) through the data line SGL(m).

In the detection period Pt1, the signal Vsgl is supplied to the second electrodes 26. In the unselected gate lines GCL(n+1) and GCL(n+2), scanning signals Vscan(n+1) and Vscan(n+2) are turned OFF (low level). Therefore, the second switching elements Trx coupled with the gate lines GCL(n+1) and GCL(n+2) are turned ON (open). The signal Vsgl is supplied to unselected first electrode blocks 25A(n+1), 25A(n+2) . . . through the second electrodes 26. The signal Vsgl is a guard signal having the same waveform synchronized with the first drive signal Vf. Accordingly, the synchronized guard signal having the same waveform as the first electrodes 25 is supplied to the periphery of each first electrode 25 of the first electrode blocks 25A(n), and thus the electrodes around the first electrodes 25 have the same potential as the first electrodes 25. Accordingly, parasitic capacitances between the first electrodes 25 and the second electrodes 26, and parasitic capacitances between each first electrode 25 of the first electrode blocks 25A(n) and the unselected first electrodes 25 are decreased. Therefore, a decrease in the detection sensitivity of the fingerprint sensor unit 20 can be suppressed.

In the detection period Pt2, the (n+1)th gate line GCL(n+1) is selected, and a scanning signal Vscan(n+1) is turned ON (high level). The first switching elements Tr coupled with the (n+1)th gate line GCL(n+1) are supplied with the scanning signal Vscan(n+1) and turned ON (open). Accordingly, the first drive signal Vf is supplied to each first electrode 25 of the first electrode blocks 25A(n+1) corresponding to the gate line GCL(n+1) through the data line SGL(m+1). In the detection period Pt2, the signal Vsgl is supplied to the second electrodes 26 and the unselected first electrode blocks 25A(n) and 25A(n+2).

In the detection period Pt3, the (n+2)th gate line GCL(n+2) is selected, and a scanning signal Vscan (n+2) is turned ON (high level). The first switching elements Tr coupled with the (n+2)th gate line GCL(n+2) are supplied with the scanning signal Vscan(n+2) and turned ON (open). Accordingly, the first drive signal Vf is supplied to each first electrode 25 of the first electrode block 25A(n+2) corresponding to the gate line GCL(n+2) through the data line SGL(m+2). In the detection period Pt3, the signal Vsgl is supplied to the second electrodes 26 and the unselected first electrode blocks 25A(n) and 25A(n+1).

With repetition of the above operation, the first detection signal Vdet1 is output to the first detection unit 40 (see FIG. 1) from the first electrodes 25 at the position overlapped with the second electrode 26A where the finger Fg comes in contact or close, on the basis of the detection principle in the self-capacitance system. In doing so, the detection operation of the fingerprint is performed by the fingerprint sensor unit 20.

Figure 20:
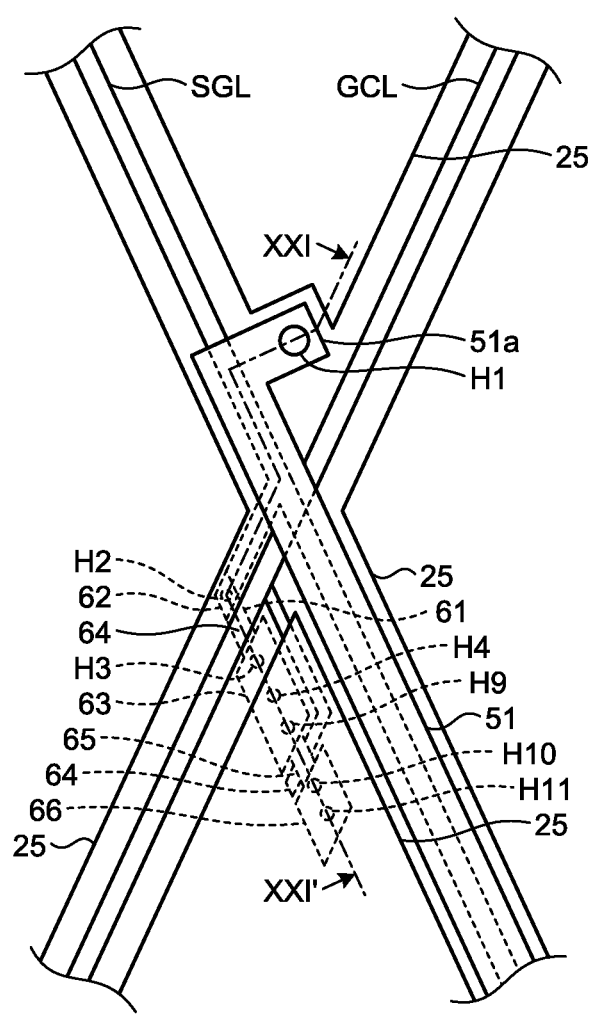
FIG. 20 is a plan view for describing a configuration of the first electrode and a switching element.
Figure 21:
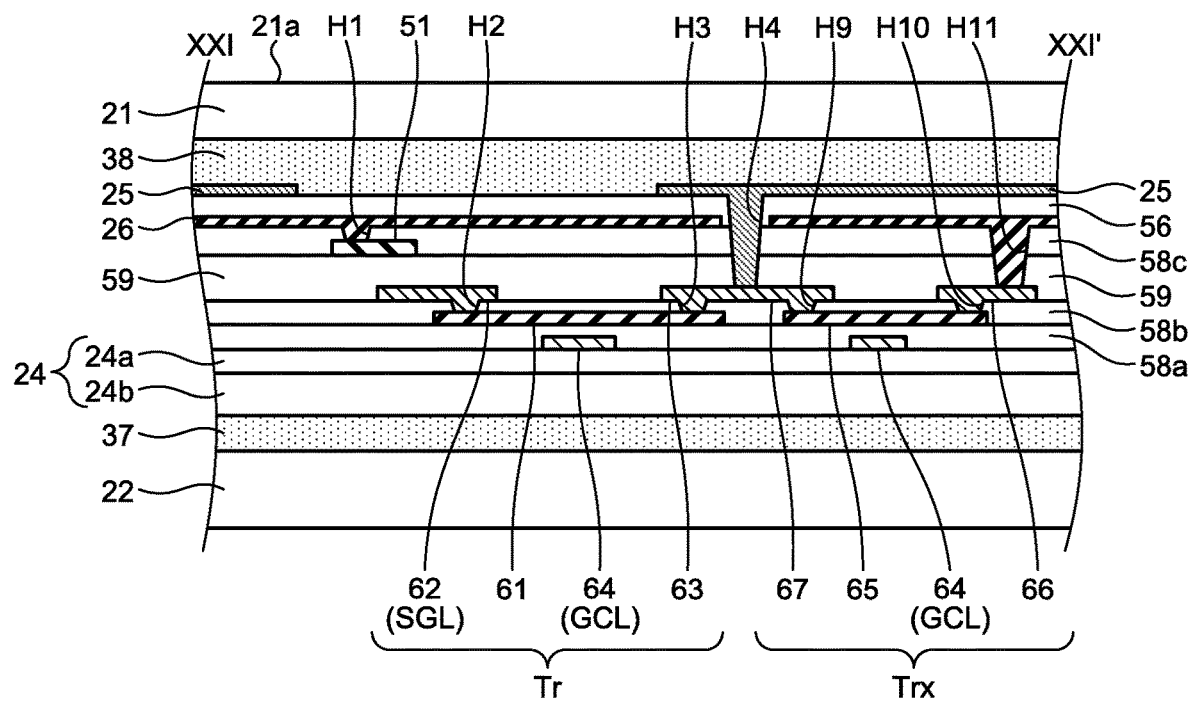
FIG. 21 is a sectional view along an XXI-XXI' line of FIG. 20.

Next, configurations of the first electrode 25, the second electrode 26, the first switching element Tr, and the second switching element Trx will be described. FIG. 20 is a plan view for describing a configuration of the first electrode and the switching elements. FIG. 21 is a sectional view along the XXI-XXI' line of FIG. 20.

As illustrated in FIG. 20, sides of the adjacent first electrodes 25 are spaced and face each other, and the gate line GCL and the data line SGL are provided between the first electrodes 25 to intersect with each other. Near an intersection of the gate line GCL and the data line SGL, the first electrode 25 is coupled with a drain electrode 63 of the first switching element Tr through a contact hole H4. In FIG. 20, the second electrode 26 is omitted for simplicity of the drawing.

As illustrated in FIG. 21, the first switching element Tr includes a semiconductor layer 61, a source electrode 62, the drain electrode 63, and a gate electrode 64.

As illustrated in FIG. 21, the sensor base material 24 is bonded above the second substrate 22 with the adhesive layer 37 interposed therebetween. The sensor base material 24 includes a film base material 24b, and a resin layer 24a provided on the film base material 24b. The gate line GCL is provided on the resin layer 24a of the sensor base material 24. An insulating layer 58a is provided on the gate line GCL, and the semiconductor layer 61 is provided on the insulating layer 58a. An insulating layer 58b is provided on the semiconductor layer 61, and the drain electrode 63 and the data line SGL are provided on the insulating layer 58b. A planarizing layer 59 is provided on the drain electrode 63 and the data line SGL, and the wire 51 is provided on the planarizing layer 59. An insulating layer 58c is provided on the wire 51, and the second electrode 26 is provided on the insulating layer 58c. The insulating layer 56 is provided on the second electrode 26, and the first electrode 25 is provided on the insulating layer 56, as described above.

The semiconductor layer 61 is coupled with the drain electrode 63 through a contact hole H3. The semiconductor layer 61 intersects with the gate line GCL in plan view. In the gate line GCL, a portion overlapped with the semiconductor layer 61 functions as the gate electrode 64. The semiconductor layer 61 is provided along the data line SGL, and is bent at a position overlapped with the data line SGL. The semiconductor layer 61 is electrically coupled with the data line SGL through a contact hole H2. In the data line SGL, a portion overlapped with the semiconductor layer 61, functions as the source electrode 62. In this way, the data line SGL and the first switching element Tr, and the gate line GCL and the first switching element Tr are electrically coupled. In FIGS. 20 and 21, the portion of the semiconductor layer 61 intersecting with the gate line GCL is one spot. However, the semiconductor layer 61 may be bent to intersect with the gate line GCL twice.

As illustrated in FIG. 21, the second switching element Trx is provided in the same layer as the first switching element Tr. The second switching element Trx includes a semiconductor layer 65, a source electrode 66, a drain electrode 67, and a gate electrode 64. In this example, as the drain electrode 67 of the second switching element Trx, a common electrode to the drain electrode 63 of the first switching element Tr is used.

The semiconductor layer 65 is coupled with the drain electrode 67 through a contact hole H9. The drain electrode 67 is coupled with the first electrode 25 through a contact hole H4. The semiconductor layer 65 is provided along the data line SGL and intersects with the gate line GCL in plan view. In the gate line GCL, a portion overlapped with the semiconductor layer 65 function as the gate electrode 64. As illustrated in FIG. 20, the gate electrode 64 of the second switching element Trx branches from the gate line GCL and is electrically coupled with the gate electrode 64 of the first switching element Tr. That is, the first switching element Tr and the second switching element Trx share the gate line GCL. The semiconductor layer 65 is coupled with the second electrode 26 through contact holes H10 and H11. In this way, the first electrode 25 and the second switching element Trx, and the second electrode 26 and the second switching element Trx are electrically coupled.

As the material of the semiconductor layer 61, known material such as polysilicon or an oxide semiconductor can be used. For example, a transparent amorphous oxide semiconductor (TAOS) can be used.

As illustrated in FIG. 20, the wire 51 is arranged to be overlapped with the data line SGL. A tab 51a is provided near the intersection of the data line SGL and the gate line GCL, and protrudes in a direction intersecting with the wire 51. The tab 51a is provided at a position not overlapped with the data line SGL, and is electrically coupled with the second electrode 26 through the contact hole H1. In this way, the second electrode 26 and the wire 51 are electrically coupled.

With such a configuration, the first electrode 25 is arranged on detection surface 21a side of the first substrate 21 with respect to the first switching element Tr, the second electrode 26, and each wire. Therefore, the distance between the finger to be detected and the first electrode 25 decreases, and the favorable detection sensitivity can be obtained.

Figure 22:
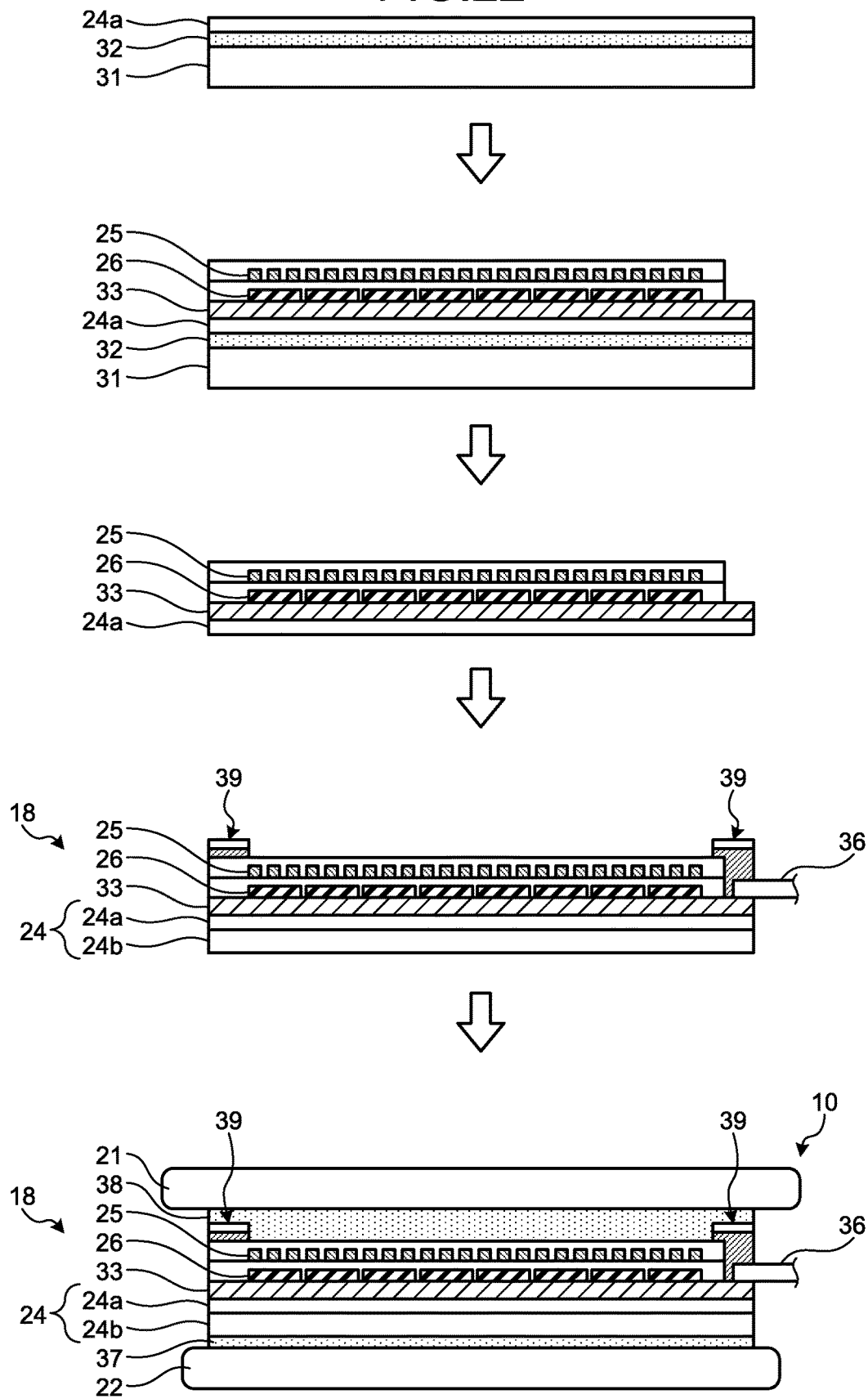
FIG. 22 is an explanatory view for describing an example of a process of manufacturing the cover member.

FIG. 22 is an explanatory view for describing an example of a process of manufacturing the cover member. First, the resin layer 24a is formed on a glass substrate 31 with an adhesion layer 32 interposed therebetween. The resin layer 24a is, for example, a polyimide resin. A wiring layer 33 including the first switching elements Tr, the data lines SGL, the gate lines GCL, and the like, the second electrodes 26, and the first electrodes 25 are laminated in this order above the resin layer 24a. After that, heat treatment is applied to the glass substrate 31, and the resin layer 24a is separated from the glass substrate 31. Then, the film base material 24b of film-like resin material different from the glass substrate 31 is prepared, and the resin layer 24a is bonded on the film base material 24b. Accordingly, the first switching elements Tr (omitted in FIG. 22), the first electrodes 25, the second electrodes 26, and the like are provided above the film-like sensor base material 24, and the film-like sensor unit 18 is formed.

The decorative layer 39 may be formed above the sensor unit 18 by a printing method. The flexible substrate 36 is coupled with the sensor unit 18, and the flexible substrate 36 is electrically coupled with the first electrodes 25 and the second electrodes 26. Then, the first substrate 21 is bonded to an upper side of the sensor unit 18 with the adhesive layer 38 interposed therebetween, and the second substrate 22 is bonded to a lower side of the sensor unit 18 with the adhesive layer 37 interposed therebetween. In this way, the cover member 10 is manufactured.

In the present embodiment, the film-like sensor base material 24 is used. Therefore, the entire thickness of the cover member 10 can be made thin. The first switching elements Tr are formed on the resin layer 24a of the sensor base material 24, and the sensor base material 24 is bonded with the second substrate 22. The first switching elements Tr are not formed on the second substrate 22, and thus the degree of freedom in material selection of the second substrate 22 can be increased. For example, as the second substrate 22, alkali glass containing alkali components can be used.

Figure 23:
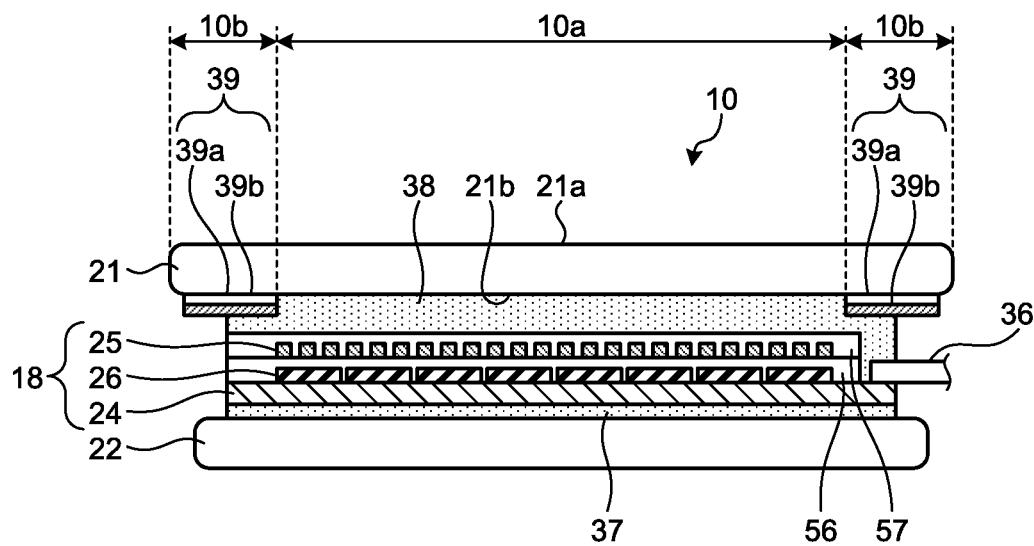
FIG. 23 is a sectional view illustrating a schematic sectional structure of a cover member according to a modification of the first embodiment.

FIG. 23 is a sectional view illustrating a schematic sectional structure of a cover member according to a modification of the first embodiment. The present modification is different in that a decorative layer 39 is provided on a first substrate 21. In this case, a first decorative layer 39a is printed and formed on an adhesion surface 21b side of the first substrate 21, and a second decorative layer 39b is laminated on the first decorative layer 39a. The first substrate 21 has a flatter surface than a sensor unit 18, and thus print formation of the decorative layer 39 is easy. The decorative layer 39 may be overlapped with a frame region 10b and provided up to an outer edge of the first substrate 21. The decorative layer 39 is provided on the adhesion surface 21b side of the first substrate 21. However, the decorative layer 39 may be provided on a detection surface 21a side.

Second Embodiment

Figure 24:
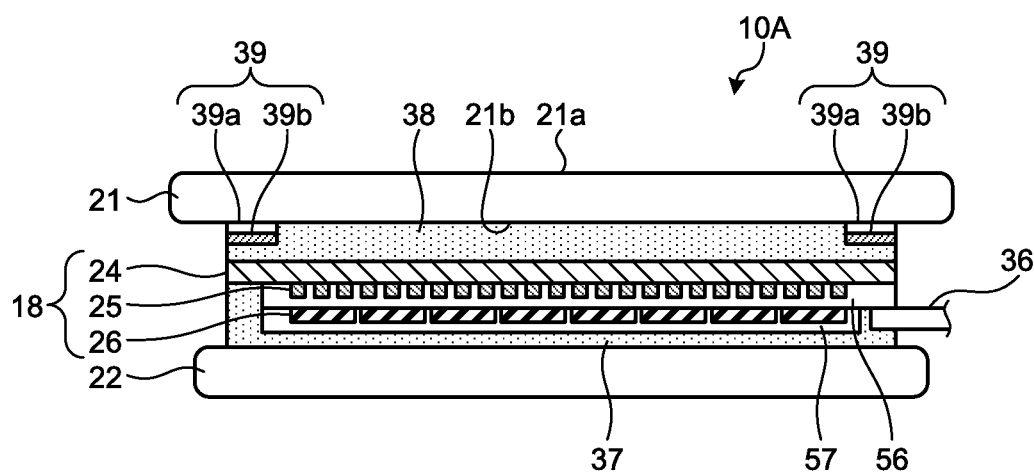
FIG. 24 is a sectional view illustrating a schematic sectional structure of a cover member according to a second embodiment.
Figure 25:
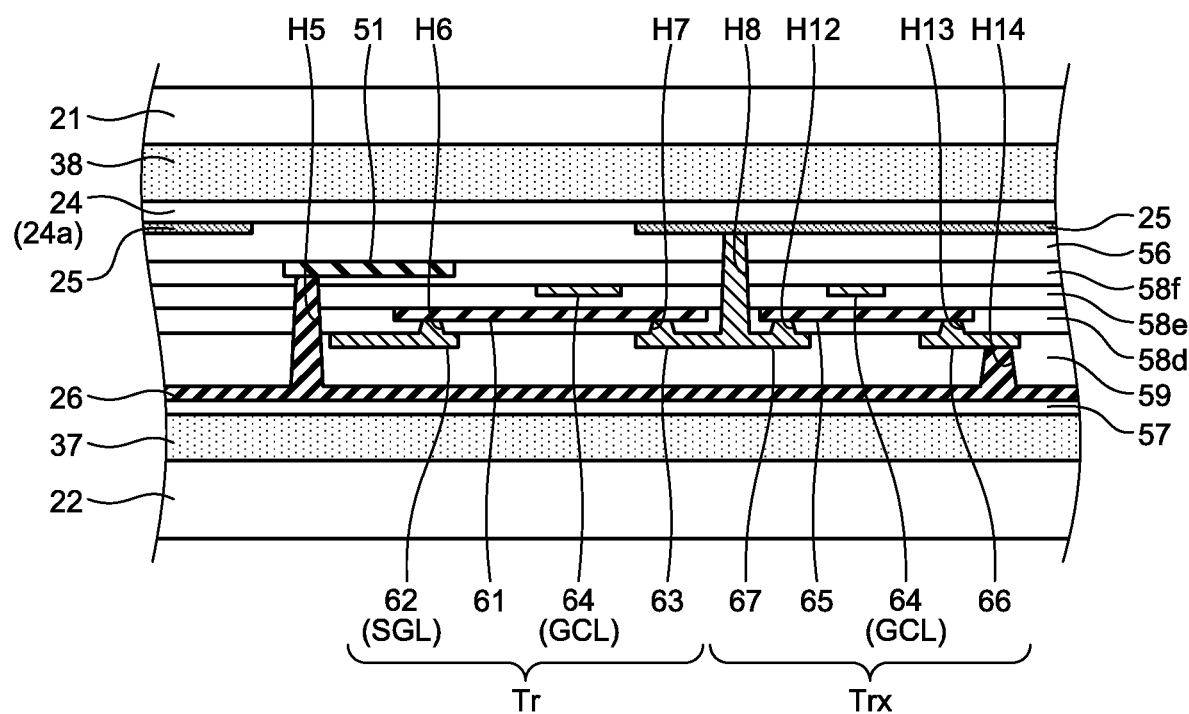
FIG. 25 is a sectional view illustrating an enlarged schematic sectional structure of the cover member according to the second embodiment.

FIG. 24 is a sectional view illustrating a schematic sectional structure of a cover member according to a second embodiment. FIG. 25 is a sectional view illustrating an enlarged schematic sectional structure of the cover member according to the second embodiment.

As illustrated in FIG. 24, in a cover member 10A of the present embodiment, a sensor base material 24 of a sensor unit 18 is provided on a detection surface 21a side with respect to first electrodes 25. Then, the sensor base material 24 is bonded with a first substrate 21 with an adhesive layer 38 interposed therebetween. The first electrodes 25 and second electrodes 26 are laminated in this order from the sensor base material 24 toward a second substrate 22. An insulating layer 57 that covers the second electrodes 26 and the second substrate 22 are bonded with an adhesive layer 37 interposed therebetween. In the present embodiment, a decorative layer 39 is provided on an adhesion surface 21b side of the first substrate 21.

As illustrated in FIG. 25, the first electrode 25, the wire 51, a first switching element Tr, and the second electrode 26 are laminated in this order from the sensor base material 24 toward the second substrate 22. An insulating layer 56 is provided between the first electrodes 25 and the wire 51. An insulating layer 58f is provided between the wire 51 and the gate line GCL. An insulating layer 58e is provided between the gate line GCL and a semiconductor layer 61. An insulating layer 58d is provided between the semiconductor layer 61 and a data line SGL, and between the semiconductor layer 61 and a drain electrode 63. A planarizing layer 59 is provided between the data line SGL and the second electrodes 26, and between the drain electrode 63 and the second electrodes 26. The insulating layer 57 is provided to cover the second electrodes 26, and the insulating layer 57 is bonded with the second substrate 22 with the adhesive layer 37 interposed therebetween.

The wire 51 and the second electrode 26 are coupled through a contact hole H5. The first electrode 25 is coupled with the drain electrode 63 through a contact hole H8. The drain electrode 63 is coupled with one end side of the semiconductor layer 61 through a contact hole H7. The other end side of the semiconductor layer 61 is coupled with a source electrode 62 through a contact hole H6. In this way, the first electrode 25 and the first switching element Tr are coupled.

As illustrated in FIG. 25, even in the present embodiment, a second switching element Trx is provided in the same layer as the first switching element Tr. The second switching element Trx includes a semiconductor layer 65, a source electrode 66, a drain electrode 67, and a gate electrode 64. The gate electrode 64 of the second switching element Trx is provided in the same layer as a gate electrode 64 of the first switching element Tr. A portion of the gate line GCL overlapped with the semiconductor layer 61 functions as the gate electrode 64 of the first switching element Tr, and a portion of the gate line GCL overlapped with the semiconductor layer 65 functions as the gate electrode 64 of the second switching element Trx. Even in this example, the first switching element Tr and the second switching element Trx share the gate line GCL. The semiconductor layer 65 of the second switching element Trx is provided in the same layer as the semiconductor layer 61. The source electrode 66 and the drain electrode 67 are provided in the same layer as the source electrode 62 and the drain electrode 63. As the drain electrode 67 of the second switching element Trx, a common electrode to the drain electrode 63 of the first switching element Tr is used.

The semiconductor layer 65 is coupled with the drain electrode 67 through a contact hole H12. The drain electrode 67 is coupled with the first electrode 25 through the contact hole H8. The semiconductor layer 65 is coupled with the source electrode 66 through a contact hole H13, and the source electrode 66 is coupled with the second electrode 26 through a contact hole H14. In this way, the first electrode 25 and the second switching element Trx, and the second electrode 26 and the second switching element Trx are electrically coupled. By providing the second switching element Trx, a signal Vsgl as a guard signal is supplied to the first electrodes 25 that are not selected as objects to be detected through the second electrodes 26. Accordingly, parasitic capacitances between the first electrodes 25 and the second electrodes 26, and parasitic capacitances between the first electrodes 25 selected as the objects to be detected and the unselected first electrodes 25 are decreased.

In the cover member 10A of the present embodiment, the sensor base material 24 includes a resin layer 24a, and is not provided with a film base material 24b (see FIG. 21). Therefore, a distance between the first electrodes 25 as sensor electrodes and the detection surface 21a is made smaller than a case provided with the film base material 24b, and favorable detection sensitivity can be obtained. In this case, in a process of manufacturing the cover member 10A, a wiring layer 33 including the first electrodes 25 and the first switching elements Tr (see FIG. 22), and the second electrodes 26 are laminated in this order on the resin layer 24a. Then, a process of bonding the resin layer 24a to the film base material 24b is omitted, and the resin layer 24a is bonded to the first substrate 21. In this way, in the present embodiment, a manufacturing process can be simplified.

Third Embodiment

Figure 26:
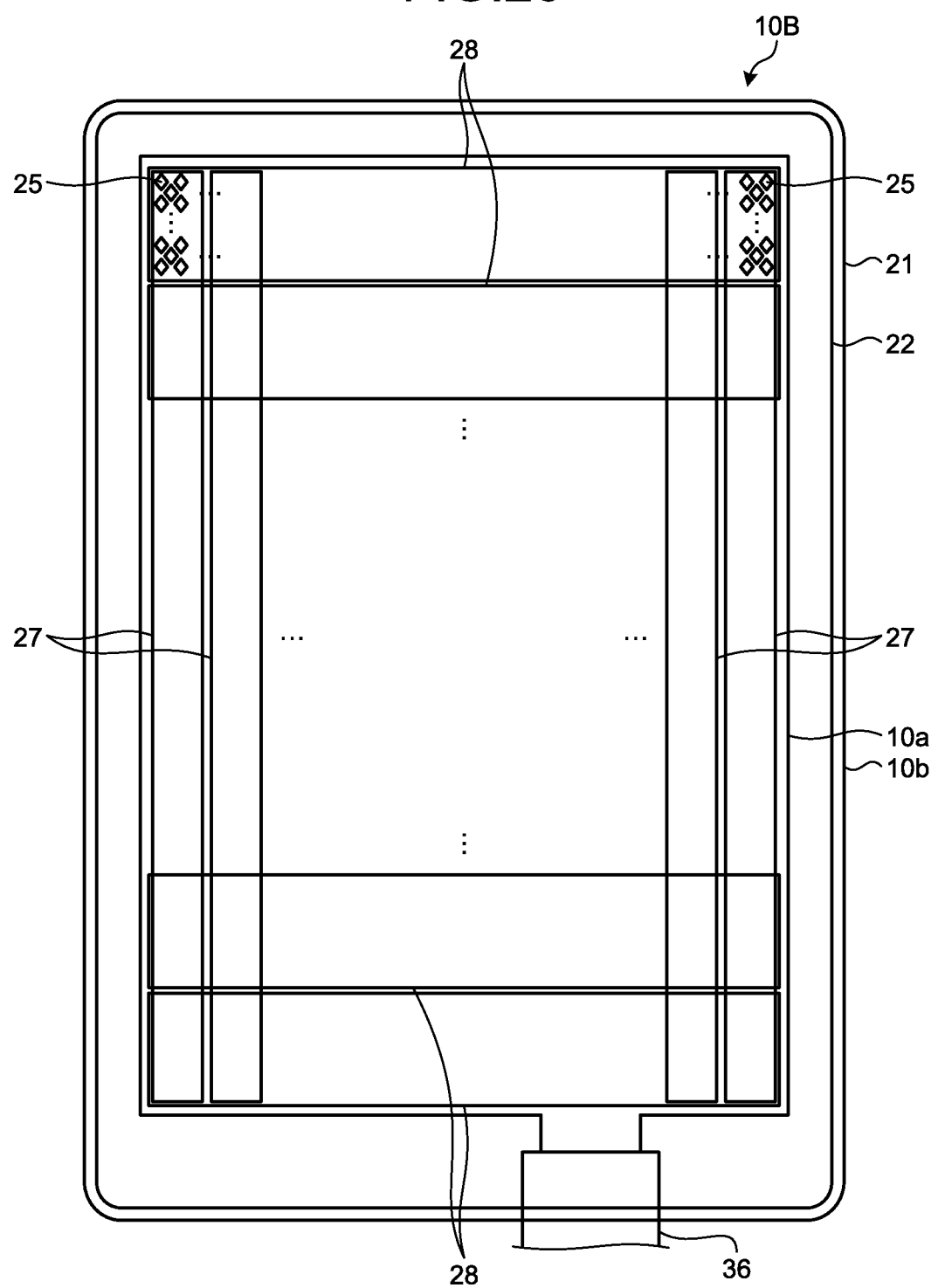
FIG. 26 is a plan view of a cover member according to a third embodiment.
Figure 27:
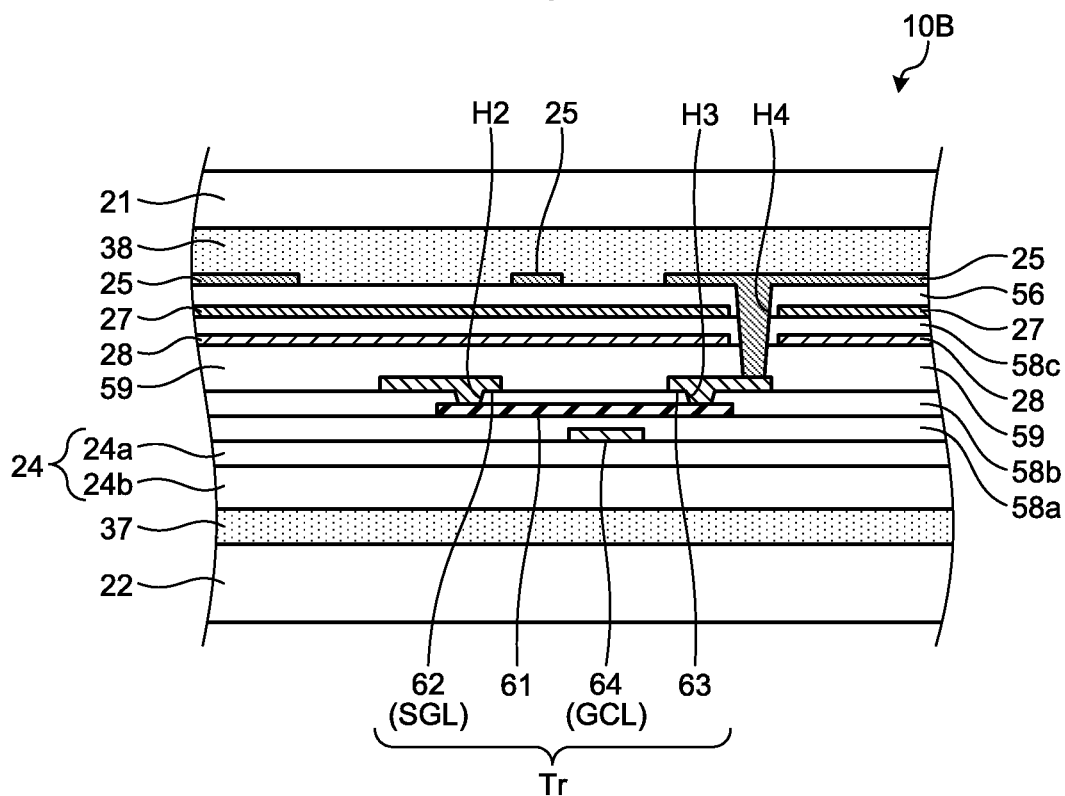
FIG. 27 is a sectional view illustrating an enlarged schematic sectional structure of the cover member according to the third embodiment.
Figure 28:
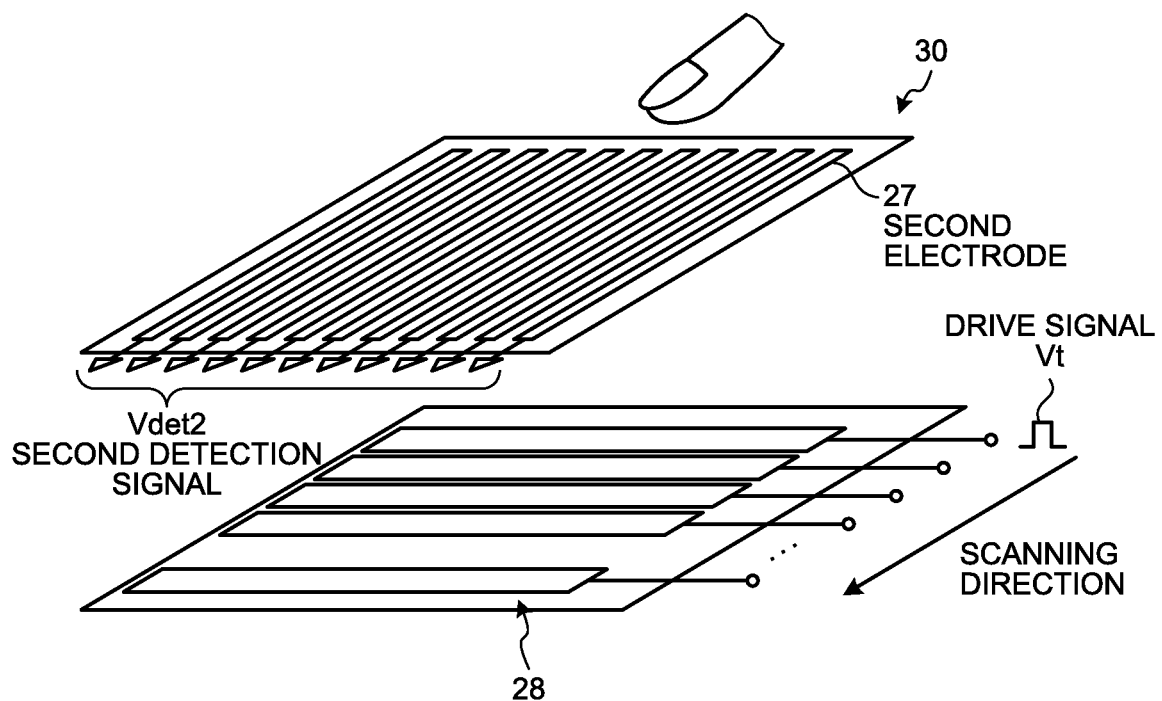
FIG. 28 is a perspective view illustrating a configuration example of drive electrodes and second electrodes of a touch sensor unit according to the third embodiment.

FIG. 26 is a plan view of a cover member according to a third embodiment. FIG. 27 is a sectional view illustrating an enlarged schematic sectional structure of the cover member according to the third embodiment. FIG. 28 is a perspective view illustrating a configuration example of drive electrodes and second electrodes of a touch sensor unit according to the third embodiment.

The above-described touch sensor unit 30 detects contact or approach of an external conductor on the basis of the detection principle in the self-capacitance system. However, an embodiment is not limited thereto, and the touch sensor unit 30 may perform detection on the basis of the detection principle in the mutual capacitance system. As illustrated in FIG. 26, a cover member 10B of the present embodiment includes a second electrode 27, and a drive electrode 28 facing the second electrode 27. As illustrated in FIG. 26, the second electrode 27 is provided along a long side of a transmissive region 10a, and a plurality of the second electrodes 27 is arrayed in a direction along a short side of the transmissive region 10a. The drive electrode 28 intersects with the second electrodes 27, and a plurality of the drive electrodes 28 is arrayed in an extending direction of the second electrodes 27. A first electrode 25 of the present embodiment has a similar configuration to the above-described configuration, and a plurality of the first electrodes 25 is arranged in a spot where the second electrode 27 and the drive electrode 28 are overlapped and intersect with each other.

The drive electrodes 28 are electrically coupled with a flexible substrate 36 through wires (not illustrated) provided in a frame region 10b. A second drive signal Vt is supplied from a second electrode driver 14 to the drive electrodes 28 through the flexible substrate 36. The second electrodes 27 are electrically coupled with the flexible substrate 36 through wires (not illustrated) provided in the frame region 10b. A second detection signal Vdet2 according to capacitance change between the second electrode 27 and the drive electrode 28 is output from the second electrode 27 to a second detection unit 80 (see FIG. 1).

As illustrated in FIG. 27, a planarizing layer 59 is provided on a first switching element Tr, and the drive electrode 28 is provided on the planarizing layer 59. An insulating layer 58c is provided on the drive electrode 28, and the second electrode 27 is provided on the insulating layer 58c. An insulating layer 56 is provided on the second electrode 27, and the first electrode 25 is provided on the insulating layer 56. The second electrode 27 and the drive electrode 28 are respectively coupled with the wires in the frame region 10b, and thus wires 51 (see FIG. 16) in a transmissive region 10a are not provided. In the present embodiment, the drive electrode 28 is provided in the layer where the wire 51 of the first embodiment is provided. Therefore, touch detection can be performed on the basis of the detection principle in the mutual capacitance system without increasing the number of laminated layers.

As illustrated in FIG. 28, the plurality of drive electrodes 28 functions as a plurality of stripe-shaped electronic patterns extending in a right and left direction of FIG. 28. The second electrodes 27 include a plurality of electrode patterns intersecting with the drive electrodes 28. Then, the second electrodes 27 face the drive electrodes 28 in a direction perpendicular to a detection surface 21a of a first substrate 21. Capacitances are respectively generated in intersections of the electrode patterns of the drive electrodes 28 and each electrode pattern of the second electrodes 27.

The shape of the second electrodes 27 and the drive electrodes 28 (drive electrode blocks) is not limited to the shape divided into a plurality of stripes. For example, the second electrodes 27 may have a comb-tooth shape. Alternatively, the second electrodes 27 may just be divided into a plurality of sections. The shape of the slit that divides the drive electrodes 28 may be a straight line or may be a curved line.

With the configuration, when a touch detection operation in the mutual capacitance system is performed in a touch sensor unit 30, the second electrode driver 14 is driven to sequentially scan each drive electrode block including the drive electrode 28 in time division, so that the drive electrode 28 of the drive electrode block is sequentially selected. Then, the second detection signal Vdet2 is output from the second electrode 27, and the touch detection of the drive electrode block is performed. That is, the drive electrode 28 corresponds to the drive electrode E2 in the basic principle of the touch detection in the mutual capacitance system, and the second electrode 27 corresponds to the detection electrode E1. The touch sensor unit 30 detects a touch input according to the basic principle. As illustrated in FIG. 28, in the touch sensor unit 30, the second electrodes 27 and the drive electrodes 28 intersecting with one another configure capacitance-type touch sensors in a matrix manner. Therefore, by scanning the entire touch detection surface of the touch sensor unit 30, the touch sensor unit 30 can detect a position where the conductor externally comes in contact or close.

A fingerprint detection operation is performed in the position detected by the touch sensor unit 30, on the basis of capacitance change of the first electrodes 25. The fingerprint detection operation is similar to that of the first embodiment. By supplying the signal Vsgl to the second electrodes 27, parasitic capacitances between the first electrodes 25 and the second electrodes 27 can be decreased.

Fourth Embodiment

Figure 29:
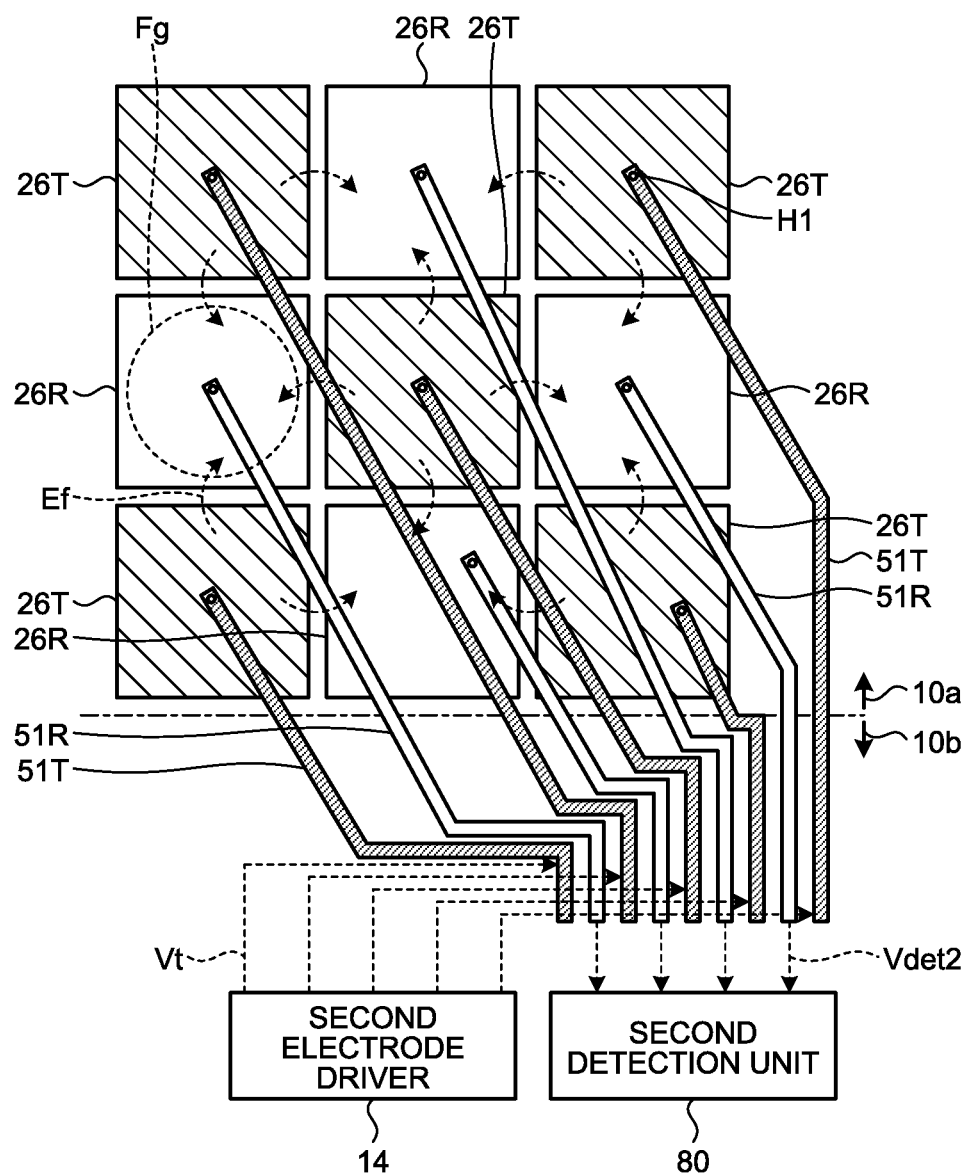
FIG. 29 is a plan view schematically illustrating configurations of second electrodes and wires according to a fourth embodiment.

FIG. 29 is a plan view schematically illustrating configurations of second electrodes and wires according to a fourth embodiment. A plurality of second electrodes 26T and 26R of the present embodiment is arranged in a matrix manner. The second electrodes 26T and the second electrodes 26R are alternately arrayed in a row direction, and are alternately arrayed in a column direction. Capacitances are generated between the second electrode 26T, and the second electrodes 26R arranged adjacent to and around the second electrode 26T.

The second electrodes 26T are electrically coupled with a second electrode driver 14 through drive wires 51T, and the second electrodes 26R are electrically coupled with a second detection unit 80 through detection wires 51R. A drive signal Vt is supplied from the second electrode driver 14 to the second electrodes 26T, and a fringing field Ef is generated between the second electrode 26T and the second electrode 26R. When a finger or the like comes in contact or close, the fringing field Ef is shielded, so that the capacitance between the second electrode 26T and the second electrode 26R is decreased. Accordingly, a second detection signal Vdet2 is output from the second electrode 26R to the second detection unit 80, and the position of the finger coming in contact with or close to a touch sensor unit 30 is detected. In the present embodiment, the second electrode 26R corresponds to the detection electrode E1 in the basic principle of the touch detection in the mutual capacitance system, the second electrode 26T corresponds to the drive electrode E2. In this way, the touch detection in the mutual capacitance system can be performed by the second electrode 26T and the second electrode 26R provided in the same layer. In this case, the layer configuration can be simplified, compared with a case of providing the drive electrode and the detection electrode in different layers.

When contact or approach of a finger Fg is detected, first electrodes 25 (not illustrated in FIG. 29) in a position overlapped with the second electrode 26R where the finger Fg comes in contact or close are driven and fingerprint detection can be performed, similarly to the first embodiment.

In the present embodiment, the drive wire 51T is individually coupled with each of the second electrodes 26T, and the detection wire 51R is individually coupled with each of the second electrodes 26R. Therefore, a method of driving the second electrodes 26T can be appropriately set. For example, the drive signal Vt may be sequentially supplied to the plurality of second electrodes 26T. Alternatively, a plurality of the second electrodes 26T arrayed in the row direction may be treated as one drive electrode block, and the plurality of second electrodes 26T may be sequentially driven in the column direction in every drive electrode block. The second electrodes 26T arrayed in the column direction may be treated as one drive electrode block, and the second electrodes 26T may be sequentially driven in the row direction in every drive electrode block.

Fifth Embodiment

Figure 30:
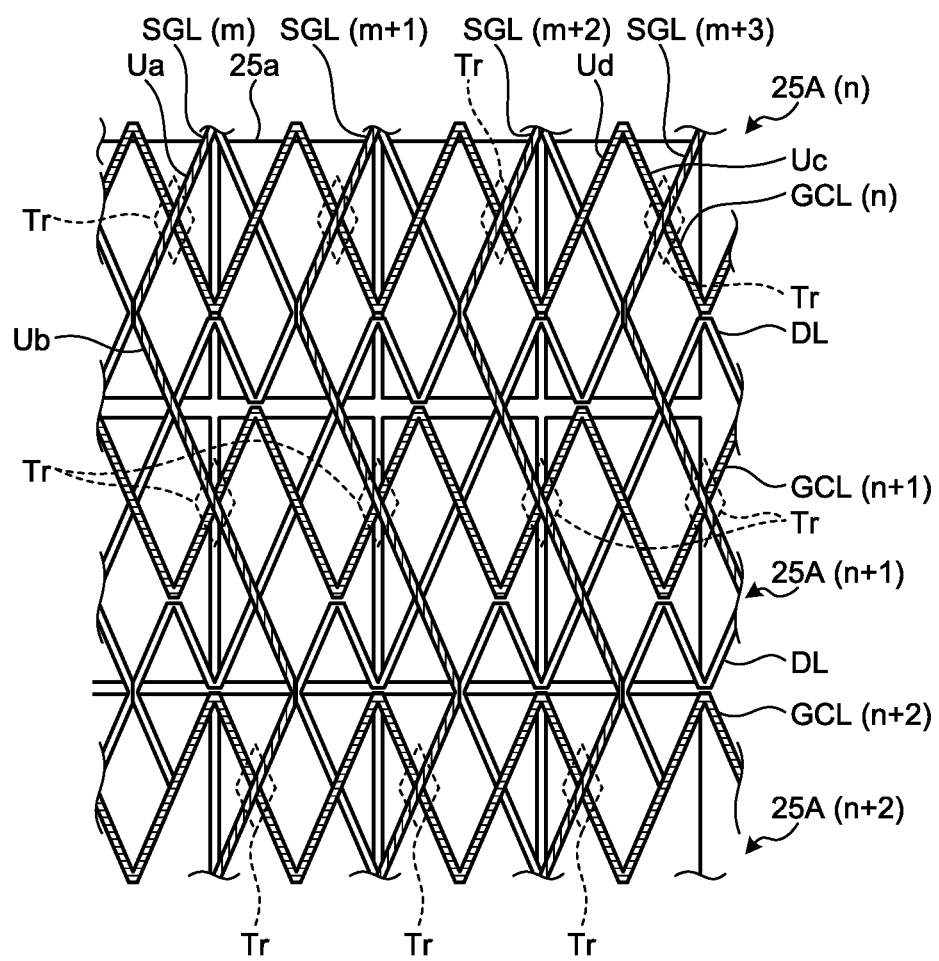
FIG. 30 is a plan view illustrating configurations of first electrodes, gate lines, and data lines of a cover member according to a fifth embodiment.

FIG. 30 is a plan view illustrating configurations of first electrodes, gate lines, and data lines of a cover member according to a fifth embodiment. A first electrode 25a of the present embodiment has a square shape, and a plurality of the first electrodes 25a is arranged in a matrix manner. A data line SGL includes a first linear portion Ua and a second linear portion Ub having a predetermined angle with respect to a column direction of the first electrodes 25a. The first linear portion Ua and the second linear portion Ub are symmetry with respect to a straight line parallel to a row direction of the first electrodes 25a. The data line SGL is formed in a zigzag manner in which the first linear portions Ua and the second linear portions Ub are alternately coupled. The data lines SGL as a whole are provided along a column direction of the first electrodes 25a.

A gate line GCL includes a third linear portion Uc and a fourth linear portion Ud having a predetermined angle with respect to the row direction of the first electrodes 25a. The third linear portion Uc and the fourth linear portion Ud are symmetry with respect to a straight line parallel to the column direction of the first electrodes 25a. The gate line GCL is formed in a zigzag manner such that the third linear portions Uc and the fourth linear portions Ud are alternately coupled. The gate lines GCL as a whole are provided along the row direction of the first electrodes 25a.

A dummy wire DL is provided apart from the gate line GCL and the data line SGL. The dummy wire DL includes a plurality of linear portions provided along the first linear portion Ua, the second linear portion Ub, the third linear portion Uc, and the fourth linear portion Ud. With the dummy wire DL, the gate line GCL, the data line SGL, and the dummy wire DL as a whole are arranged in a mesh manner. Accordingly, light transmittance is uniformed as a whole, and thus visual recognition of the gate line GCL and the data line SGL can be suppressed.

Even in the present embodiment, a first switching element Tr is provided near an intersection of the gate line GCL and the data line SGL. One first switching element Tr is provided for one first electrode 25a.

The gate lines GCL as a whole extend in the row direction, and thus the plurality of first electrodes 25a arrayed in the row direction is sequentially selected as first electrode blocks 25A that serve as objects to be detected. For example, when a scanning signal Vscan is supplied to a gate line GCL(n), the first switching elements Tr coupled with the gate line GCL(n) are turned ON. Then, a first drive signal Vf is supplied to each first electrode 25a of the first electrode blocks 25A(n) through data lines SGL(m), SGL(m+1), SGL(m+2), and SGL(m+3). First detection signals Vdet1 are output from each first electrode 25a of the first electrode blocks 25A(n), on the basis of the detection principle in the self-capacitance system. These signals are sequentially selected with gate lines GCL(n+1), and GCL(n+2), whereby fingerprint detection of a finger coming in contact or close becomes possible.

In the present embodiment, only the first switching elements Tr are illustrated. However, similarly to the structure illustrated in FIGS. 20 and 21, the first switching element Tr and a second switching element Trx may be provided for one first electrode 25a.

Sixth Embodiment

Figure 31:
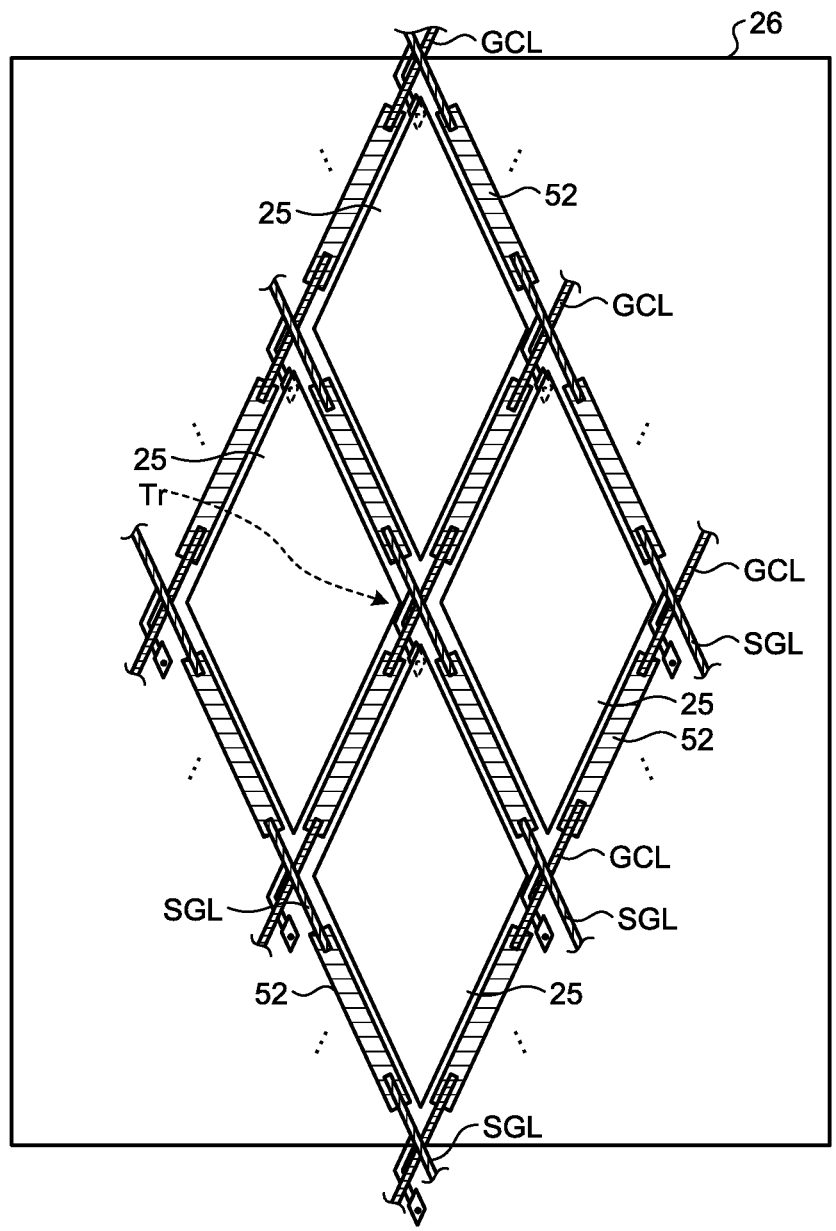
FIG. 31 is a plan view illustrating configurations of first electrodes, gate lines, and data lines of a cover member according to a sixth embodiment.

FIG. 31 is a plan view illustrating configurations of first electrodes, gate lines, and data lines of a cover member according to a sixth embodiment. In the present embodiment, a light-transmitting wire 52 that couples one gate line GCL and the other gate line GCL is provided. Further, the wire 52 that couples one data line SGL and the other data line SGL is provided. A metal material is used for the gate line GCL and the data line SGL near intersections of the gate lines GCL and the data lines SGL, that is, in spots coupled with first switching elements Tr. The wire 52 using a light-transmitting conductive material such as ITO is provided in other positions where sides of first electrodes 25 face each other. As described above, the wire 52 is used in a part of the gate lines GCL and the data lines SGL, and thus light transmittance of a transmissive region 10a can be improved.

The wire 52 such as ITO has lower conductivity than metal materials. However, the gate lines GCL and the data lines SGL of the present embodiment are provided to drive the first electrodes 25 for fingerprint detection, and thus can favorably detect fingerprint even if the gate lines GCL and the data lines SGL have a higher resistance value than display gate lines and display data lines used for a display device.

As illustrated in FIG. 31, the wire 52 coupled with the data line SGL has the same width as the wire 52 coupled with the gate line GCL. An embodiment is not limited thereto, and the wire 52 coupled with the data line SGL may have a wider width than the wire 52 coupled with the gate line GCL. A first drive signal Vf (see FIG. 19) is supplied to the wire 52 coupled with the data line SGL, as described above. Then, a signal Vsgl having the same waveform and synchronized with the first drive signal Vf is supplied to a second electrode 26 overlapped with the wire 52. Therefore, even if the wire 52 coupled with the data line SGL is made thicker, a parasitic capacitance between the wire 52 and the second electrode 26 can be suppressed.

In the present embodiment, only the first switching element Tr is illustrated. However, the first switching element Tr and a second switching element Trx may be provided for one first electrode 25, similarly to the structure of FIGS. 20 and 21.

Seventh Embodiment

Figure 32:
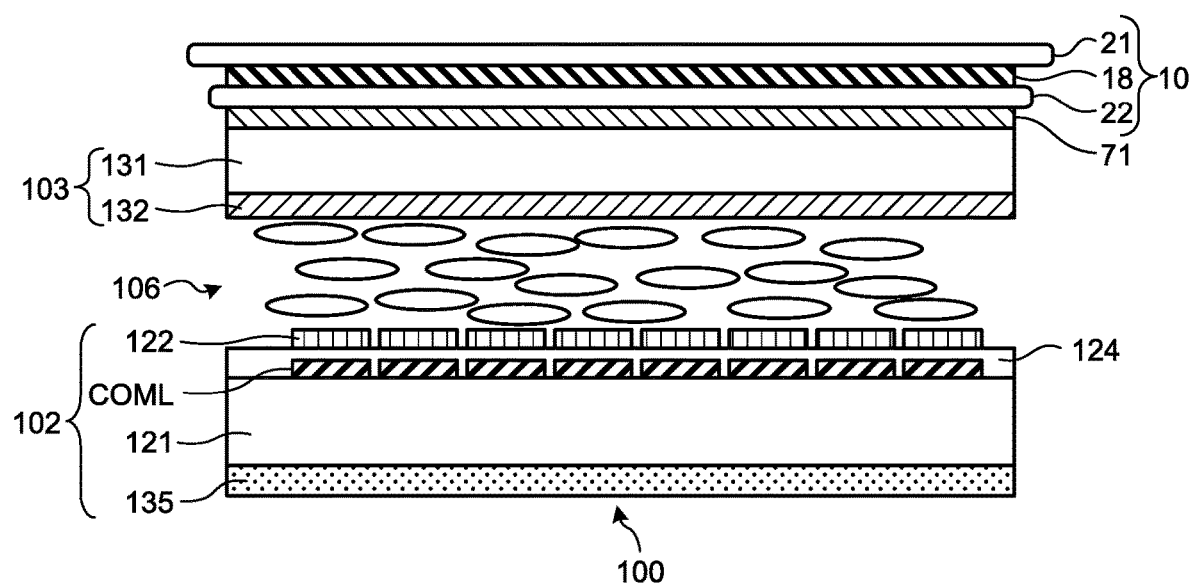
FIG. 32 is a sectional view illustrating a schematic sectional structure of a display device according to a seventh embodiment.
Figure 33:
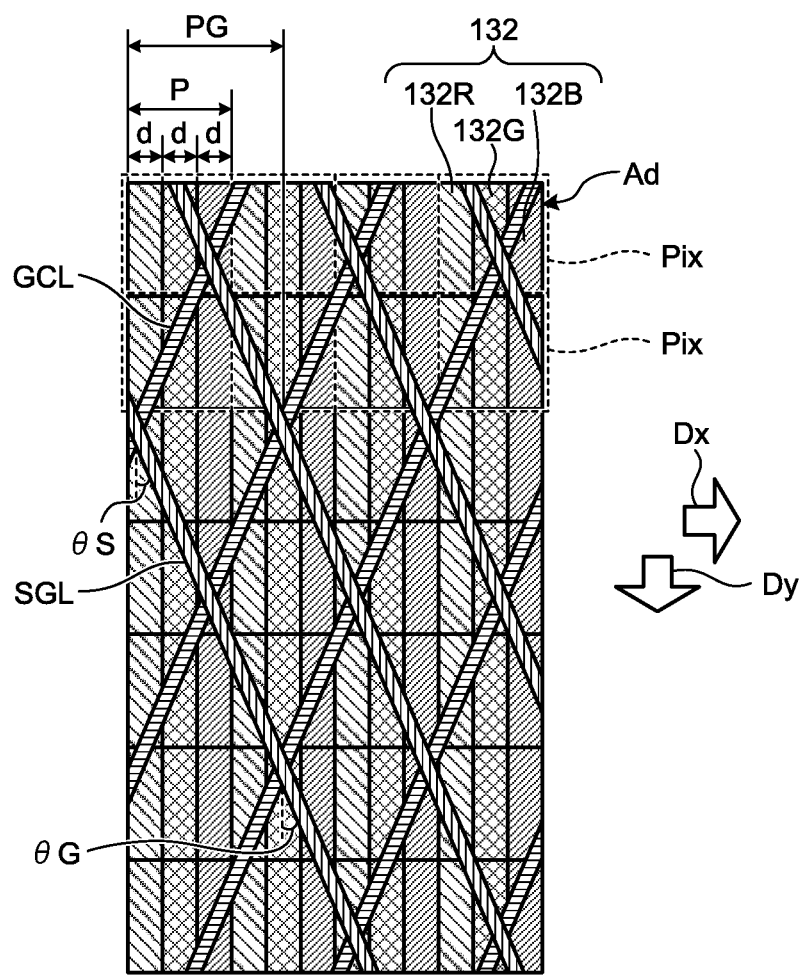
FIG. 33 is a plan view for describing a relationship between a pixel array and gate lines, and a pixel array and data lines.

FIG. 32 is a sectional view illustrating a schematic sectional structure of a display device according to a seventh embodiment. FIG. 33 is a plan view for describing a relationship between a pixel array and gate lines, and a pixel array and data lines. As illustrated in FIG. 32, a display device 100 includes a pixel substrate 102, a counter substrate 103 facing the pixel substrate 102, a liquid crystal layer 106 provided between the pixel substrate 102 and the counter substrate 103, and a cover member 10 provided above the counter substrate 103.

The pixel substrate 102 includes a TFT substrate 121 as a circuit board, a plurality of pixel electrodes 122 disposed in a matrix manner above the TFT substrate 121, a plurality of common electrodes COML provided between the TFT substrate 121 and the pixel electrodes 122, and an insulating layer 124 that insulates the common electrodes COML from the pixel electrodes 122. A polarizing plate 135 may be provided under the TFT substrate 121 with an adhesion layer interposed therebetween (not illustrated).

As illustrated in FIG. 32, the counter substrate 103 includes a glass substrate 131, and a color filter 132 formed on one surface of the glass substrate 131. The cover member 10 is provided on the other surface of the glass substrate 131 with an adhesion layer 71 interposed therebetween. The cover member 10 is one of those described in the first to sixth embodiments, and a sensor unit 18 is provided between a first substrate 21 and a second substrate 22.

As illustrated in FIG. 32, the TFT substrate 121 and the glass substrate 131 are provided to face each other with a predetermined interval. The liquid crystal layer 106 is provided in a space between the TFT substrate 121 and the glass substrate 131. The liquid crystal layer 106 modulates light that passes through an electric field according to a state of the electric field. As the liquid crystal layer 106, liquid crystal in a transverse electric field mode such as in-plane switching (IPS) including fringe field switching (FFS) is used. An oriented film may be respectively disposed between the liquid crystal layer 106 and the pixel substrate 102, and between the liquid crystal layer 106 and the counter substrate 103, illustrated in FIG. 32.

The pixel electrodes 122 are arranged in a transmissive region 10a (see FIG. 14) in a matrix manner. A region where one pixel electrode 122 is provided corresponds to a sub pixel, and a plurality of the sub pixels configures one pixel Pix as a set. As illustrated in FIG. 33, in the color filter 132, color regions 132R, 132G, and 132B of color filters colored in three colors including red (R), green (G), and blue (B), for example, are periodically arranged. The R, G, and B three color regions 132R, 132G, and 132B are associated with each sub pixel, and the color regions 132R, 132G, and 132B configure the pixel Pix as a set. The pixels Pix are arranged in a matrix manner. The color filters 132 may be a combination of other colors as long as the color filters are colored in different colors. An uncolored sub pixel may be included. The pixel Pix may include four or more color regions.

A direction parallel to a row direction, of array directions of the pixels Pix is a first direction Dx, and a direction perpendicular to the first direction Dx is a second direction Dy. The gate lines GCL and the data lines SGL of the cover member 10 are arranged to be overlapped with the pixels Pix. An angle made by the gate line GCL and the pixel Pix in an array direction (second direction Dy) is θG. An angle made by the data line SGL and the pixel Pix in an array direction (second direction Dy) is θS. The gate lines GCL are preferably provided such that the angle θG falls within a range of 28° to 38°. Especially, the angle θG preferably falls within a range of 31° to 35°. Similarly, the data lines SGL are preferably provided such that the angle θS falls within a range of 28° to 38°. Especially, the angle θS favorably falls within a range of 31° to 35°.

A pitch PG of the gate lines GCL arrayed in the first direction Dx is preferably half-integer multiple of a pitch P of the pixels Pix. That is, it is preferable to satisfy the pitch PG=(q+1/2)×P(q=0, 1, 2, . . . ). The pitch PG preferably falls within a range of (q+1/2)×P×0.9≤PG≤(q+1/2)×P×1.1. In the present embodiment, the data lines SGL arrayed in the first direction Dx are arrayed at the same pitch PG as the gate lines GCL. The pitch of the data lines SGL is also preferably half-integer multiple of the pitch P of the pixels Pix. The pitch P of the pixels Pix is a total of widths d of the color regions 132R, 132G, and 132B included in the pixel Pix.

The gate line GCL and the data line SGL respectively have portions overlapped with the color regions 132R, 132G, and 132B. Therefore, specific color regions 132R, 132G, and 132B are less likely to be shielded by the gate lines GCL and the data lines SGL. Therefore, a difference in brightness in each color region is less likely to occur in the display device 100, and a possibility to visually recognize moiré can be decreased. Especially, the gate lines GCL and the data lines SGL are provided within the angle ranges at the pitches described above so that a period of a light-and-shade pattern is likely to be shortened to the extent that the period cannot be visually recognized by a human. Therefore, the possibility to visually recognize moiré can be decreased.

Although illustration is omitted in FIG. 33, the wire 51 illustrated in FIG. 16 is overlapped with the data line SGL and provided along the data line SGL. That is, an angle made by the wire 51 and the array direction (second direction Dy) of the pixels Pix is the same angle as the angle θS, and is preferably provided to fall within the range of 28° to 38°. Especially, the angle of the wire 51 more preferably falls within the range of 31° to 35°. The pitch of the wire 51 arrayed in the first direction Dx is preferably half-integer multiple of the pitch P of the pixels Pix.

Favorable embodiments of the present invention have been described. However, the present invention is not limited to these embodiments. The content disclosed in the embodiments is merely examples, various modifications can be made without departing from the points of the present invention. Appropriate modifications made without departing from the points of the present invention obviously belong to the technical scope of the present invention.

For example, the sensor unit 18 of the cover member 10 includes the fingerprint sensor unit 20 and the touch sensor unit 30. However, the embodiment is not limited thereto. For example, the sensor unit 18 of the cover member 10 may not include the touch sensor unit 30. In this case, the second electrode 26 serves as the guard drive electrode to which the signal Vsgl is supplied at the time of the fingerprint detection operation. The shapes of the first electrode 25, the second electrodes 26 and 27, and the drive electrode 28 are examples only, and various modifications can be made. The numbers, arrangement, and shapes of the gate lines GCL and the data lines SGL may be appropriately changed.

What is claimed is:

1. A cover member comprising:
    a first substrate including a first surface and a second surface on an opposite side of the first surface, the first surface being a detection surface for detecting a finger in contact with or in proximity to the first surface and detecting unevenness of the finger;

a second substrate facing the second surface;

adhesive layers including a first adhesive layer and a second adhesive layer; and a sensor unit that is bonded with the first substrate and the second substrate, and that is configured to detect positional coordinates of the finger and to detect the unevenness of the finger, wherein the sensor unit includes:

a plurality of first electrodes configured to detect the unevenness of the finger based on self-capacitance changes of the respective first electrodes, a plurality of second electrodes configured to detect the finger based on self-capacitance changes of the respective second electrodes, a size of the respective second electrodes being greater than a size of the respective first electrodes, and the second electrodes overlapping an entire area of at least two of the first electrodes, a sensor base material, a first insulating layer, and a second insulating layer, the second adhesive layer, the sensor base material, the second electrodes, the second insulating layer, the first electrodes, the first insulating layer, and the first adhesive layer are sequentially stacked on the second substrate in a first direction perpendicular to the second substrate, the first substrate includes a transmissive region configured to transmit an image, and a frame region outside the transmissive region, the sensor unit is provided overlapping both the frame region and the transmissive region of the first substrate, a decorative layer is provided on the second surface of the first substrate in the frame region, and the frame region of the first substrate overlaps the second adhesive layer, the sensor base material, the second insulating layer, the first insulating layer, the first adhesive layer, and the decorative layer, which are sequentially stacked on the second substrate in the first direction.

2. The cover member according to claim 1, wherein the first substrate and the second substrate have the same linear expansion coefficient.

3. The cover member according to claim 1, wherein the same material is used for the first substrate and the second substrate.

4. The cover member according to claim 1, wherein the first substrate has the same thickness as or is thinner than the second substrate.

5. The cover member according to claim 1, wherein the sensor unit includes switching elements provided in positions respectively corresponding to the first electrodes, gate lines for supplying scanning signals that scan the switching elements, and data lines for supplying signals to the switching elements.

6. The cover member according to claim 5, wherein the first substrate includes a transmissive region for transmitting an image, and
at least one of the gate lines and the data lines are inclined with respect to one side of the transmissive region.

7. The cover member according to claim 5, wherein at least one of the gate lines and the data lines contain a light-transmitting conductive material.

8. The cover member according to claim 1, wherein the first electrodes are provided in a position closer to the detection surface than the second electrodes are.

9. The cover member according to claim 8, comprising a plurality of wires for supplying a drive signal to the second electrodes.

10. The cover member according to claim 9, wherein the second electrodes are supplied with a signal through the wires, the signal being synchronized with a signal to be supplied to the first electrodes.

11. The cover member according to claim 8, wherein,
a position of the finger in contact with or in proximity to the first surface is detected based on the detection signal from the second electrodes, and
the unevenness of the finger in the position is detected based on the self-capacitance changes of the first electrodes.

12. The cover member according to claim 1, wherein the second electrodes overlap gaps between respective ones of the first electrodes that are adjacent to each other, and
the second electrodes face the first substrate through the gaps.

13. The cover member according to claim 1, wherein a guard signal is supplied to the second electrodes at a time of a fingerprint detection operation in which the unevenness of the finger is detected based on the self-capacitance changes of the respective first electrodes.

14. The cover member according to claim 13, wherein the guard signal has an identical waveform synchronized with a first drive signal that is supplied through data lines to corresponding first electrodes at the time of the fingerprint detection operation.

15. A display device comprising:
the cover member according to claim 1; and
a display unit provided on an opposite side of the first substrate with respect to the second substrate, and provided to face the transmissive region of the first substrate and configured to display an image.

16. A cover member comprising:
a first substrate including a first surface and a second surface on an opposite side of the first surface, the first surface being a detection surface for detecting a finger in contact with or in proximity to the first surface and detecting unevenness of the finger;
a second substrate facing the second surface;
adhesive layers including a first adhesive layer and a second adhesive layer; and
a sensor unit that is bonded with the first substrate and the second substrate, and that is configured to detect positional coordinates of the finger and to detect the unevenness of the finger, wherein
the sensor unit includes:
a plurality of first electrodes configured to detect the unevenness of the finger based on self-capacitance changes of the respective first electrodes,
a plurality of second electrodes configured to detect the finger based on self-capacitance changes of the respective second electrodes, a size of the respective second electrodes being greater than a size of the respective first electrodes, and the second electrodes overlapping an entire area of at least two of the first electrodes,
a sensor base material,
a first insulating layer, and
a second insulating layer, and the second adhesive layer, the second insulating layer, the second electrodes, the first insulating layer, the first electrodes, the sensor base material, and the first adhesive layer are sequentially stacked on the second substrate in a first direction perpendicular to the second substrate, the first substrate includes a transmissive region configured to transmit an image, and a frame region outside the transmissive region, the sensor unit is provided overlapping both the frame region and the transmissive region of the first substrate, a decorative layer is provided on the second surface of the first substrate in the frame region, and the frame region of the first substrate overlaps the second adhesive layer, the sensor base material, the first adhesive layer, and the decorative layer, which are sequentially stacked on the second substrate in the first direction.

17. The cover member according to claim 16, wherein the second electrodes overlap gaps between respective ones of the first electrodes that are adjacent to each other, and the second electrodes face the first substrate through the gaps.

18. The cover member according to claim 16, wherein a guard signal is supplied to the second electrodes at a time of a fingerprint detection operation in which the unevenness of the finger is detected based on the self-capacitance changes of the respective first electrodes.

19. The cover member according to claim 18, wherein the guard signal has an identical waveform synchronized with a first drive signal that is supplied through data lines to corresponding first electrodes at the time of the fingerprint detection operation.

20. A display device comprising:

the cover member according to claim 16; and a display unit provided on an opposite side of the first substrate with respect to the second substrate, and provided to face the transmissive region of the first substrate and configured to display an image.

* * * * *